United States Patent
Kameno et al.

(10) Patent No.: US 9,113,372 B2
(45) Date of Patent: Aug. 18, 2015

(54) WIRELESS COMMUNICATION SYSTEM, BASE STATION APPARATUS, COMMUNICATION APPARATUS, AND COMMUNICATION CONTROL PROGRAM

(75) Inventors: Toshiaki Kameno, Osaka (JP); Koichi Tsunekawa, Osaka (JP); Katsutoshi Ishikura, Osaka (JP); Yoshio Konno, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 377 days.

(21) Appl. No.: 13/582,367

(22) PCT Filed: Mar. 3, 2011

(86) PCT No.: PCT/JP2011/054898
§ 371 (c)(1),
(2), (4) Date: Aug. 31, 2012

(87) PCT Pub. No.: WO2011/108637
PCT Pub. Date: Sep. 9, 2011

(65) Prior Publication Data
US 2012/0322486 A1    Dec. 20, 2012

(30) Foreign Application Priority Data

Mar. 5, 2010  (JP) ................................ 2010-049674

(51) Int. Cl.
*H04B 7/00* (2006.01)
*H04W 24/10* (2009.01)
(Continued)

(52) U.S. Cl.
CPC .............. *H04W 28/16* (2013.01); *H04L 5/001* (2013.01); *H04L 5/006* (2013.01); *H04L 5/0035* (2013.01);
(Continued)

(58) Field of Classification Search
USPC ......... 455/434–444, 130, 211, 227, 260, 273, 455/313–316, 323, 524, 525, 552.1; 375/340; 370/331, 335, 342
See application file for complete search history.

(56) References Cited

U.S. PATENT DOCUMENTS 7,123,891 B2 * 10/2006 Loke .............................. 455/130
(Continued)

FOREIGN PATENT DOCUMENTS

WO    WO 2010/084688 A1    7/2010

OTHER PUBLICATIONS

3GPP TR 36.814 V1.5.0(Nov. 2009), "Further advancements for E-UTRA Physical layer aspects", chapter 5, retrieved Jan. 4, 2010, Internet URL:http://www.3gpp.org/ftp/Specs/archive/36_series/36.814.
(Continued)

*Primary Examiner* — Dominic E Rego
(74) *Attorney, Agent, or Firm* — Birch, Stewart, Kolasch & Birch, LLP

(57) ABSTRACT

A CA decision part selects a component carrier to be used for communication with a terminal apparatus from component carriers used for communication by a plurality of base station apparatuses. A CA set notification part notifies a sub-base station apparatus of carrier aggregation information indicating the component carrier selected by the CA decision part. A transmission unit of a main base station apparatus allocates a signal, which is obtained by modulating a part of data to be transmitted to the terminal apparatus, on a first component carrier selected by the CA decision part, and transmits the signal. A transmission unit of the sub-base station apparatus allocates a signal, which is obtained by modulating a part of the data to be transmitted to the terminal apparatus, on a second component carrier indicated by notified carrier aggregation information, and transmits the signal. A reception unit of the terminal apparatus receives the signal from the main base station apparatus using the first component carrier and the signal from the sub-base station apparatus using the second component carrier. A wireless processing part integrates the signals received by the reception unit.

16 Claims, 19 Drawing Sheets

(51) Int. Cl.
  *H04W 24/06* (2009.01)
  *H04W 72/08* (2009.01)
  *H04W 28/16* (2009.01)
  *H04L 5/00* (2006.01)
  *H04W 88/08* (2009.01)

(52) U.S. Cl.
  CPC .............. *H04L 5/0098* (2013.01); *H04L 5/0023* (2013.01); *H04L 5/0044* (2013.01); *H04W 88/08* (2013.01)

(56) References Cited

U.S. PATENT DOCUMENTS

| | | | |
|---|---|---|---|
| 2005/0111405 A1* | 5/2005 | Kanterakis | 370/328 |
| 2011/0235590 A1* | 9/2011 | Li et al. | 370/328 |
| 2011/0292824 A1 | 12/2011 | Uemura et al. | |

OTHER PUBLICATIONS

NTT DOCOMO: "Views on Component Carrier Types for Carrier Aggregation in LTE-Advanced", 3GPP TSG RAN WG1 Meeting #58, R1-093507, Shenzen, China, Aug. 24-28, 2009, retrieved Jan. 4, 2010, internet URL:http://www.3gpp.org/ftp/tsg_ran/WG1_RL1/TSGR1_58/Docs/R1-093507.zip.

Panasonic: "LTE-advanced discussion for RAN2", 3GPP TSG RAN WG2 #65bis, R2-092394, [online], 3rd Generaiton Partnership Project, Mar. 27, 2009, retrieved Mar. 25, 2011, Internet <URL:http://www.3gpp.org/ftp/tsg_ran/WG2_RL2/TSGR2_65bis/Docs/R2-092394.zip>.

Panasonic: "Synchronization channel and system information for Carrier aggregation", R1-091750, May 4-8, 2009, SF, USA, retrieved Jan. 4, 2010, Internet URL:http://www.3gpp.org/ftp/tsg_ran/WG1_RL1/TSGR1_57/Docs/R1-091750.zip.

Research in Motion, UK Limited, Support of Carrier Aggregation with Heterogeneous Deployment of Component Carriers, 3GPP TSG RAN WG1 Meeting #58 R1-093289, Aug. 28, 2009.

* cited by examiner

FIG. 4

| TERMINAL IDENTIFICATION NUMBER | BASE STATION IDENTIFICATION NUMBER | BASE STATION TYPE | DL CC IDENTIFICATION NUMBER | CC TYPE |
|---|---|---|---|---|
| C | A | MAIN | CC1 | SUB |
| C | A | MAIN | CC2 | MAIN |
| C | B | SUB | CC3 | SUB |
| ... | ... | ... | ... | ... |

FIG. 5

| BASE STATION IDENTIFICATION NUMBER | BASE STATION TYPE | DL CC IDENTIFICATION NUMBER | CC TYPE |
|---|---|---|---|
| A | MAIN | CC1 | SUB |
| A | MAIN | CC2 | MAIN |
| B | SUB | CC3 | SUB |
| ... | ... | ... | ... |

FIG. 8

|  |  | DL CC IDENTIFICATION NUMBER |  |  |  |  |  |  |
|---|---|---|---|---|---|---|---|---|
|  |  | CC1 | CC2 | CC3 | CC4 | CC5 | CC6 | ... |
| BASE STATION IDENTIFICATION NUMBER | A | 10 | 8 | 6 | 3 | 3 | 4 |  |
|  | B | 8 | 6 | 9 | 4 | 3 | 2 |  |
|  | C | 2 | 3 | 4 | 3 | 2 | 1 |  |
|  | D | 1 | 0 | 2 | 1 | 0 | 0 |  |
|  | : |  |  |  |  |  |  |  |

QUALITY LEVEL
(INDICATES THAT QUALITY IS EXCELLENT PROPORTIONALLY TO VALUE)

FIG. 20

| TERMINAL IDENTIFICATION NUMBER | BASE STATION IDENTIFICATION NUMBER | DL CC IDENTIFICATION NUMBER | CC TYPE |
|---|---|---|---|
| a | A | CC1 | SUB |
| a | A | CC2 | MAIN |
| a | B | CC3 | SUB |
| ... | ... | ... | ... |

FIG. 21

| BASE STATION IDENTIFICATION NUMBER | DL CC IDENTIFICATION NUMBER | CC TYPE |
|---|---|---|
| A | CC1 | SUB |
| A | CC2 | MAIN |
| B | CC3 | SUB |
| ... | ... | ... |

WIRELESS COMMUNICATION SYSTEM, BASE STATION APPARATUS, COMMUNICATION APPARATUS, AND COMMUNICATION CONTROL PROGRAM

TECHNICAL FIELD

The present invention relates to a wireless communication system, a base station apparatus, a communication apparatus, and a communication control program.

The present application contains subject matter related to that disclosed in Japanese Priority Patent Application JP 2010-049674 filed in Japan Patent Office on Mar. 5, 2010, the entire content of which is hereby incorporated by reference.

BACKGROUND ART

In 3GPP ($3^{rd}$ Generation Partnership Project), LTE-A (LTE-Advanced) has been discussed as the next communication scheme of LTE (Long Term Evolution; ($3^{rd}$ Generation)) currently designed in the Rel-8 of 3GPP. In the LTE-A, it has been required to perform high rate communication and support a wide bandwidth (a 100 MHz band exceeding a 20 MHz band of LTE) as compared with the LTE.

However, it is difficult to ensure a continuous frequency band of a wide bandwidth for the LTE-A worldwide. Furthermore, it is preferable that the LTE-A be compatible with the LTE.

In this regard, there has been proposed carrier aggregation (CA) technology in which a plurality of carriers with a bandwidth of 20 MHz are collectively used for communication to ensure a bandwidth of 100 MHz at maximum and perform large capacity communication at a high speed. This CA technology was admitted as communication technology to be used in the LTE-A in 3GPP RAN 1#53b meeting (Non-Patent Document 1). In addition, in the CA technology, a carrier up to 20 MHz is called a component carrier (CC).

Meanwhile, the CA technology has been known as in the following Non-Patent Documents 2 and 3.

Non-Patent Document 2 discloses CA technology for a plurality of CCs with the same coverage which are transmitted from one base station. Furthermore, Non-Patent Document 2 discloses CA technology in which LTE non-compatible CCs to be defined in the LTE-A are considered, in addition to CCs defined in the LTE in relation to CCs, and technology in which directionality of a standard design for a synchronization method, system information, control information and the like has been suggested.

Furthermore, Non-Patent Document 3 discloses CA technology for LTE compatible CCs and LTE non-compatible CCs, and technology using the CA technology according to a communication traffic state of each cell.

PRIOR ART DOCUMENTS

Non-Patent Documents

Non-Patent Document 1: 3GPP TR 36.814, "Further advancements for E-UTRA Physical layer aspects", chapter 5, [search on Jan. 4, 2010], Internet URL: http://www.3gpp.org/ftp/Specs/archive/36_series/36.814

Non-Patent Document 2: R1-091750, [search on Jan. 4, 2010], Internet URL: http://www.3gpp.org/ftp/tsg_ran/WG1_RL1/TSGR1_57/Docs/R1-091750.zip Non-Patent Document 3: "Views on Component Carrier Types for Carrier Aggregation in LTE-Advanced", [search on Jan. 4, 2010], Internet URL: http://www.3gpp.org/ftp/tsg_ran/WG1_RL1/TSGR1_58/Docs/R1-093507.zip

DISCLOSURE OF INVENTION

Problem to be Solved by the Invention

However, in the conventional technology, terminal apparatuses simultaneously communicate with one base station apparatus using carrier aggregation technology. That is, in the conventional technology, there is a problem in that it is necessary for one base station apparatus to select component carriers to be used for communication with the terminal apparatuses from component carriers to be used for communication.

The present invention provides a wireless communication system capable of obtaining diversity of a component carrier, a base station apparatus, a communication apparatus, and a communication control program.

Means to Solve the Problem (1) The present invention is made was made to solve the above-described problem, a first aspect of the present invention is a wireless communication system including: a communication apparatus that performs communication using a plurality of component carriers of a prescribed frequency band; and a plurality of base station apparatuses, wherein a first base station apparatus allocates a signal, which is obtained by modulating a part of data to be transmitted to the communication apparatus, on a first component carrier, and transmits the signal, a second base station apparatus allocates a signal, which is obtained by modulating a part of data to be transmitted to the communication apparatus, on a second component carrier, and transmits the signal, and the communication apparatus demodulates the signal received from the first base station apparatus using the first component carrier and the signal received from the second base station apparatus using the second component carrier, and integrates the demodulated data.

(2) In the first aspect of the present invention, the first base station apparatus may include: a carrier aggregation decision part configured to select component carriers to be used for communication with the communication apparatus from component carriers used for communication by the plurality of base station apparatuses; a carrier aggregation information notification part configured to notify the second base station apparatus of carrier aggregation information indicating the component carriers selected by the carrier aggregation decision part; and a first transmission unit configured to allocate the signal, which is obtained by modulating a part of the data to be transmitted to the communication apparatus, on the first component carrier selected by the carrier aggregation decision part, and transmit the signal, the second base station apparatus may include: a second transmission unit configured to allocate the signal, which is obtained by modulating a part of the data to be transmitted to the communication apparatus, on the second component carrier indicated by the carrier aggregation information notified of by the first base station apparatus, and transmit the signal, and the communication apparatus may include: a reception unit configured to receive the signal from the first base station apparatus using the first component carrier and the signal from the second base station apparatus using the second component carrier; and a wireless processing part configured to integrate the signals received by the reception unit.

(3) In the first aspect of the present invention, the carrier aggregation information notification part may notify the communication apparatus of the carrier aggregation information, and the reception unit receives the signals based on the carrier aggregation information of which the first base station apparatus is notified.

(4) In the first aspect of the present invention, the first component carrier may be one main component carrier selected from the component carriers used for communication by the plurality of base station apparatuses.

(5) In the first aspect of the present invention, the first base station apparatus may include: a data distribution part configured to divide the data to be transmitted to the communication apparatus based on the carrier aggregation information, and transmit the divided data to the second base station apparatus, wherein the first transmission unit may allocate a signal, which is obtained by modulating the data divided by the data distribution part, on the component carrier selected by the carrier aggregation decision part, and transmit the signal, the second base station apparatus may include: a data transmission/reception processing part configured to receive the data received from the first base station apparatus, wherein the second transmission unit may allocate a signal, which is obtained by modulating the data received by the data transmission/reception processing part, on the component carrier indicated by the carrier aggregation information notified of by the first base station apparatus, and transmit the signal.

(6) In the first aspect of the present invention, the carrier aggregation information may include base station information for identifying the base station apparatuses, component carrier identification information for identifying the component carriers, and component carrier type information indicating whether a component carrier of the component carrier identification information may be a main component carrier.

(7) In the first aspect of the present invention, the wireless communication system may include a plurality of communication apparatuses, wherein each of the first base station apparatus and the second base station apparatus may include: a carrier aggregation information storage part configured to store the carrier aggregation information, wherein the carrier aggregation information stored in the carrier aggregation information storage part may include communication apparatus identification information for identifying the communication apparatuses, the base station information for identifying the base station apparatuses, the component carrier identification information for identifying the component carriers, and the component carrier type information indicating whether the component carrier of the component carrier identification information is a main component carrier.

(8) In the first aspect of the present invention, the communication apparatus may include: a wireless processing part configured to perform communication standby using one component carrier of the first base station apparatus, and transmit a connection request to the first base station apparatus at a time of generation of communication, wherein the carrier aggregation decision part may select component carriers to be used for communication with the communication apparatus in case that the connection request is received from the communication apparatus.

(9) In the first aspect of the present invention, the carrier aggregation decision part may select the component carriers to be used for communication with the communication apparatus based on a propagation quality or a communication traffic amount of each component carrier used for communication by the plurality of base station apparatuses.

(10) In the first aspect of the present invention, the first base station apparatus may include: a switching detection part configured to determine whether to switch the component carriers to be used for communication with the communication apparatus; and a switching execution part configured to select the component carriers to be used for communication with the communication apparatus from the component carriers used for communication by the plurality of base station apparatuses in case that the handover detection part has determined to change the component carrier, wherein the carrier aggregation information notification part may notify the second base station apparatus of carrier aggregation information indicating the component carriers selected by the switching execution part; the first transmission unit may allocate the signal, which is obtained by modulating a part of the data to be transmitted to the communication apparatus, on the first component carrier selected by the switching execution part, and transmit the signal, and the reception unit may switch a component carrier for receiving the signal to the component carrier indicated by the carrier aggregation information notified of by the first base station apparatus.

(11) In the first aspect of the present invention, the switching detection part may determine whether to switch the component carrier based on the propagation quality or the communication traffic amount of each component carrier used for communication by the plurality of base station apparatuses, and the switching execution part may select the component carriers to be used for communication with the communication apparatus based on the propagation quality or the communication traffic amount of each component carrier used for communication by the plurality of base station apparatuses.

(12) In the first aspect of the present invention, the switching execution part may select one main component carrier from the selected component carriers, and a main base station apparatus using the main component carrier, which is selected by the switching execution part, for communication with the communication apparatus may include: a switching detection part configured to determine whether to switch the component carriers to be used for communication with the communication apparatus; and a switching execution part configured to select the component carriers to be used for communication with the communication apparatus from the component carriers used for communication by the plurality of base station apparatuses in case that the handover detection part has determined to change the component carrier.

(13) In the first aspect of the present invention, the main base station apparatus may include: a data distribution part configured to divide the data to be transmitted to the communication apparatus based on carrier aggregation information indicating the component carriers selected by the switching execution part, and transmits the divided data to the second base station apparatus; and a transmission unit configured to allocate a signal, which is obtained by modulating the data divided by the data distribution part, on the component carrier selected by the switching execution part, and transmit the signal, and the second base station apparatus may include: a data transmission/reception processing part configured to receive the data received from the main base station apparatus; and a second transmission unit configured to allocate a signal, which is obtained by modulating the data received by the data transmission/reception processing part, on the component carrier indicated by the carrier aggregation information notified of by the first base station apparatus, and transmit the signal.

(14) In the first aspect of the present invention, the reception unit may switch only a changed component carrier among the component carriers indicated by the carrier aggregation information notified of by the first base station apparatus.

(15) In the first aspect of the present invention, the switching execution part or the carrier aggregation decision part may select the main component carrier based on the propagation quality or the communication traffic amount of each component carrier used for communication by the plurality of base station apparatuses.

(16) A second aspect of the present invention is a base station apparatus, which communicates with a communication apparatus using a plurality of component carriers of a prescribed frequency band, the base station apparatus including: a carrier aggregation decision part configured to select a component carrier to be used for communication with the communication apparatus from component carriers used for communication by the plurality of base station apparatuses; a carrier aggregation information notification part configured to notify another base station apparatus of carrier aggregation information indicating the component carrier selected by the carrier aggregation decision part; and a transmission unit configured to allocate a signal, which is obtained by modulating a part of data to be transmitted to the communication apparatus, on the component carrier selected by the carrier aggregation decision part, and transmit the signal.

(17) A third aspect of the present invention is a communication apparatus, which performs communication using a plurality of component carriers of a prescribed frequency band, the communication apparatus including: a reception unit configured to receive a signal from a first base station apparatus using a first component carrier and a signal from a second base station apparatus using a second component carrier; and a wireless processing part configured to integrate the signals received by the reception unit.

(18) A fourth aspect of the present invention is a communication control method in a base station apparatus, which communicates with a communication apparatus using a plurality of component carriers of a prescribed frequency band, the method including: selecting, by a carrier aggregation decision part, a component carrier to be used for communication with the communication apparatus from component carriers used for communication by the plurality of base station apparatuses; notifying, by a carrier aggregation information notification part, another base station apparatus of carrier aggregation information indicating the selected component carrier; and allocating, by a transmission unit, a signal, which is obtained by modulating a part of data to be transmitted to the communication apparatus, on the selected component carrier, and transmitting the signal.

(19) A fifth aspect of the present invention is a communication control method in a communication apparatus, which performs communication using a plurality of component carriers of a prescribed frequency band, the method including: receiving, by a reception unit, a signal from a first base station apparatus using a first component carrier and a signal from a second base station apparatus using a second component carrier; and integrating, by a wireless processing part, the received signals.

(20) A sixth aspect of the present invention is a communication control program for causing a computer of a base station apparatus, which communicates with a communication apparatus using a plurality of component carriers of a prescribed frequency band, to perform: selecting a component carrier to be used for communication with the communication apparatus from component carriers used for communication by the plurality of base station apparatuses; notifying another base station apparatus of carrier aggregation information indicating the selected component carrier; and allocating a signal, which is obtained by modulating a part of data to be transmitted to the communication apparatus, on the selected component carrier, and transmitting the signal.

(21) A seventh aspect of the present invention is a communication control program for causing a computer of a communication apparatus, which performs communication using a plurality of component carriers of a prescribed frequency band, to perform: receiving a signal from a first base station apparatus using a first component carrier and a signal from a second base station apparatus using a second component carrier; and integrating the received signals.

Effect of the Invention

According to the present invention, it is possible for the wireless communication system to obtain diversity of a component carrier.

BRIEF DESCRIPTION OF THE DRAWINGS

FIG. 4 is a schematic view illustrating an example of DLCC allocation information stored in a base station apparatus according to the present embodiment.

FIG. 5 is a schematic view illustrating an example of DLCC allocation information stored in a terminal apparatus according to the present embodiment.

FIG. 8 is a schematic view illustrating an example of DL propagation path quality information according to the present embodiment.

FIG. 20 is a schematic view illustrating an example of DLCC allocation information stored in a base station apparatus according to a variant of the present embodiment.

FIG. 21 is a schematic view illustrating an example of DLCC allocation information stored in a terminal apparatus according to a variant of the present embodiment.

BEST MODE FOR CARRYING OUT THE INVENTION

Hereinafter, an embodiment of the present invention will be described in detail with reference to the accompanying drawings.

Figure 1:
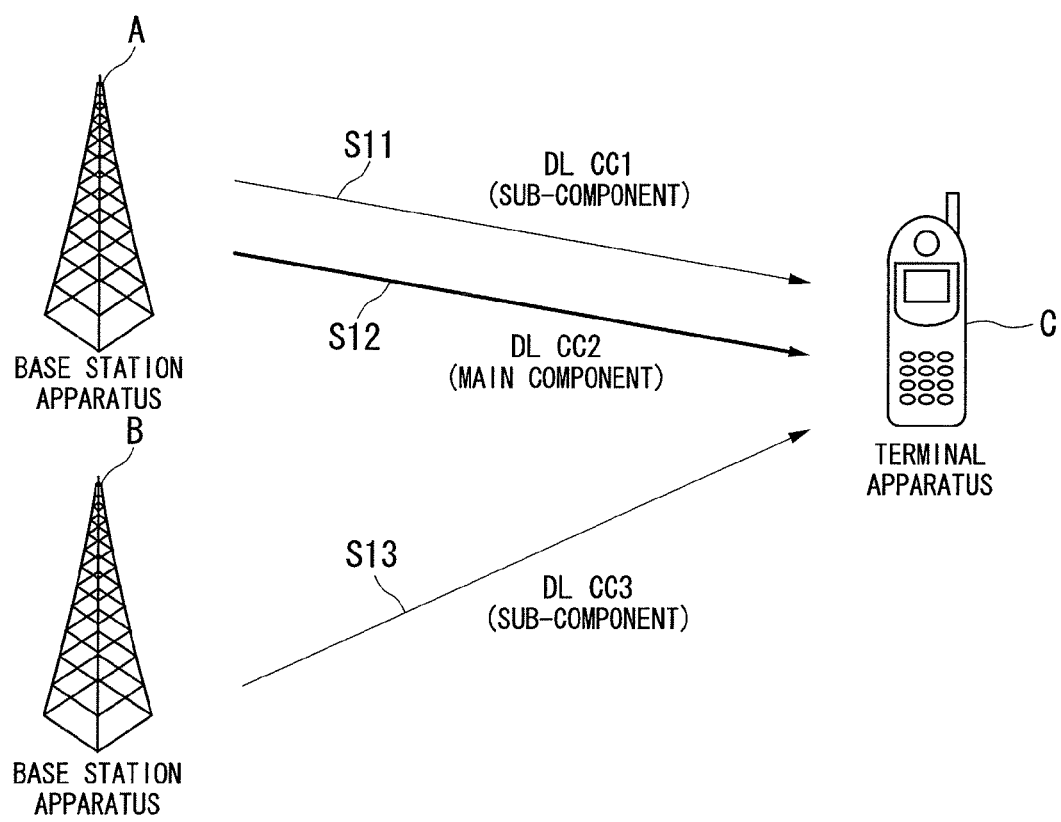
FIG. 1 is a conceptual diagram illustrating a communication system of the present invention.

FIG. 1 is a conceptual diagram illustrating a communication system of the present invention. In FIG. 1, the communication system includes base station apparatuses A and B and a terminal apparatus C. For example, the terminal apparatus C is a mobile station apparatus such as a cellular phone. Furthermore, the base station apparatuses A and B are connected to each other through a core network.

In FIG. 1, the base station apparatus A and the terminal apparatus C communicate with each other in a wireless manner, and the base station apparatus B and the terminal apparatus C communicate with each other in a wireless manner. In this communication, a plurality of component carriers (hereinafter referred to as CCs; for example, a frequency band of 20 MHz) are used. FIG. 1 illustrates that three CCs are used for communication (hereinafter referred to as downlink (DL)) to the terminal apparatus C from the base station apparatuses A and B. For the communication to the terminal apparatus C from the base station apparatus A, CC1 (DL CC1) with a reference numeral S11 and CC2 (DL CC2) with a reference numeral S12 are used, and for the communication to the terminal apparatus C from the base station apparatus B, CC3 (DL CC3) with a reference numeral S13 is used.

Here, it is possible for the base station apparatuses A and B to perform the communication using CC1 to CC3. However, the example of FIG. 1 illustrates that the base station apparatus A selects three (CC1 and CC2 of the base station apparatus A and CC3 of the base station apparatus B) of the total six CCs. In addition, in the example of FIG. 1, the case in which it is possible for the base station apparatuses A and B to perform the communication using CC1 to CC3 is described. However, the present invention is not limited thereto. For example, one of the base station apparatuses may not perform communication using the CCs, or one or both of the base station apparatuses may perform communication using CC4.

In addition, communication technology capable of performing large capacity communication at a high speed using a plurality of CCs for communication will be referred to as carrier aggregation (CA) technology. Furthermore, communication to the base station apparatuses A and B from the terminal apparatus C will be referred to as uplink (UL) communication.

Furthermore, FIG. 1 illustrates that the DL CC2 is allocated to the terminal apparatus C as a main component carrier (main CC). The main CC is one CC allocated to each terminal apparatus by the base station apparatuses A and B, and main control such as selection or handover of CCs is performed through the main CC. In addition, among CCs used for communication with the terminal apparatus C, CCs (DL CC1 and DL CC3 in the example of FIG. 1) other than the main CC will be referred to as sub-component carriers (sub-CCs). Furthermore, the main CC and the sub-CCs will be collectively referred to as a CA set.

Furthermore, a base station apparatus using the main CC for communication with the terminal apparatus C will be referred to as a main base station apparatus (the base station apparatus A in the example of FIG. 1), and a base station apparatus using only the sub-CC for communication with the terminal apparatus C will be referred to as a sub-base station apparatus (the base station apparatus B in the example of FIG. 1).

Figure 2:
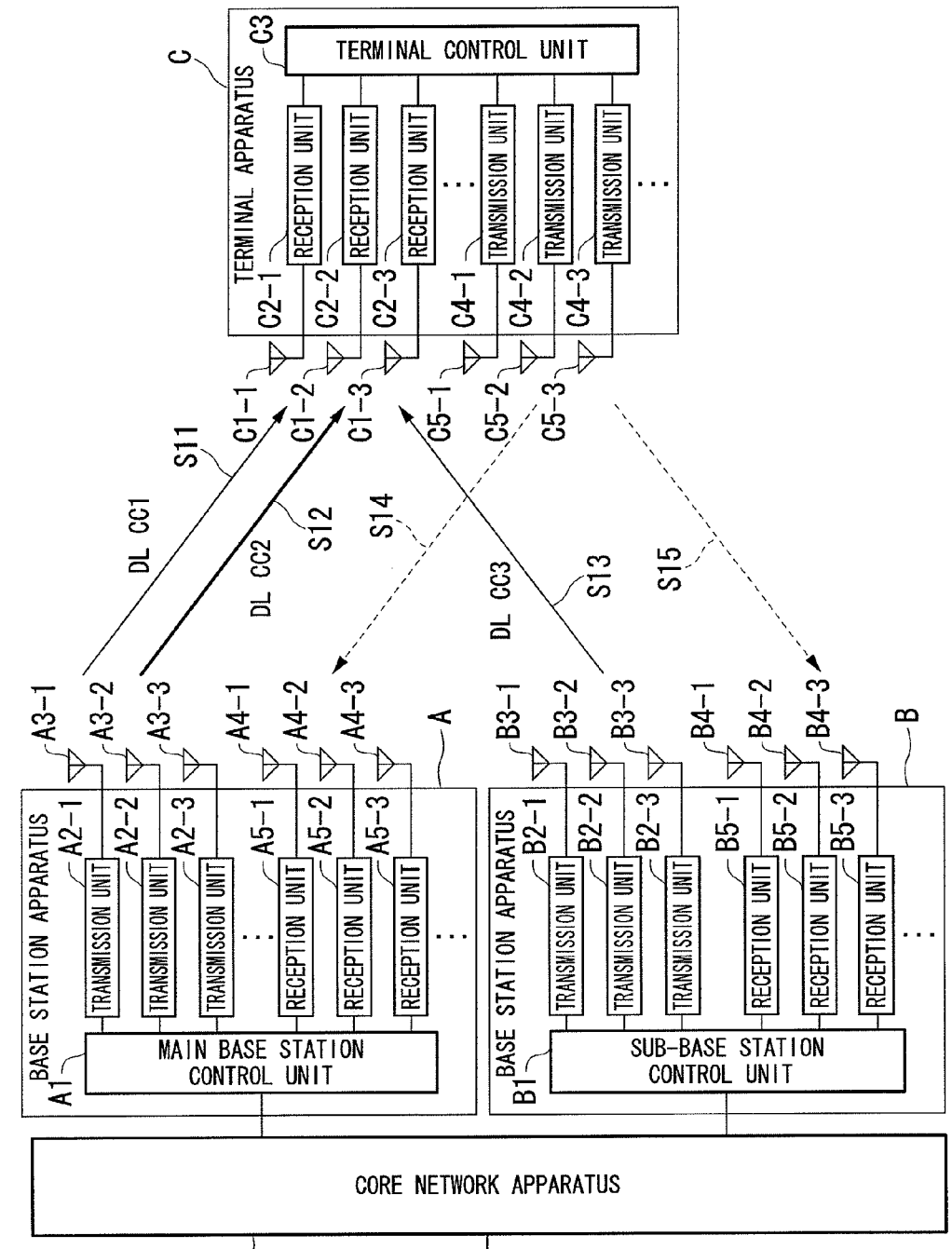
FIG. 2 is a schematic block diagram illustrating the configurations of a base station apparatus and a terminal apparatus according to the present embodiment.

FIG. 2 is a schematic block diagram illustrating the configurations of the base station apparatuses A and B and the terminal apparatus C according to the present embodiment. In FIG. 2, the base station apparatuses A and B are connected to a core network apparatus D, are connected to each other through the core network apparatus D, and perform data transmission and reception. Furthermore, FIG. 2 illustrates the case in which the base station apparatus A is a main base station apparatus and the base station apparatus B is a sub-base station apparatus.

The base station apparatus A includes a main base station control unit A1, transmission units A2-1 to A2-3, transmission antennas A3-1 to A3-3, reception antennas A4-1 to A4-3, and reception units A5-1 to A5-3. Furthermore, the base station apparatus B includes a sub-base station control unit B1, transmission units B2-1 to B2-3, transmission antennas B3-1 to B3-3, reception antennas B4-1 to B4-3, and reception units B5-1 to B5-3. Furthermore, the terminal apparatus C includes reception antennas C1-1 to C1-3, reception units C2-1 to C2-3, a terminal control unit C3, transmission units C4-1 to C4-3, and transmission antennas C5-1 to C5-3.

In the base station apparatus A, the main base station control unit A1 controls each element of the base station apparatus A. Furthermore, the main base station control unit A1 decides allocation of CCs based on a propagation quality, a traffic amount and the like. The main base station control unit A1 generates DLCC allocation information indicating a main CC and sub-CCs (including the CC used by the base station apparatus B) in a decided downlink, and ULCC allocation information indicating allocation of CCs in a decided uplink. FIG. 2 illustrates the same example of the communication system of FIG. 1, wherein the DL CC2 is allocated as the main CC and DL CC1 and DL CC3 are allocated as the sub-CCs.

The main base station control unit A1 divides data, which is addressed to the terminal apparatus C between data input from the core network apparatus D and generated data, in each CC to be used for transmission based on the DLCC allocation information. The main base station control unit A1 outputs signals of the data divided in each CC to the transmission units A2-1 to A2-3 that transmit signals using the CC, and transmits the signals to the base station apparatus B that transmits signals using the CC. Here, the main base station control unit A1 generates control information to be used to control communication with the terminal apparatus C, and outputs the control information to a transmission unit (the transmission unit A2-2 in the example of FIG. 2) that performs communication using a main CC. This control information includes the DLCC allocation information, the ULCC allocation information, and information for controlling a handover process. Furthermore, the main base station control unit A1 transmits the generated control information to the base station apparatus B.

Furthermore, the main base station control unit A1 integrates data of signals, which are received from the terminal apparatus C and are input from the reception units A5-1 to A5-3, and data received from the base station apparatus B. The main base station control unit A1 outputs the integrated data to the core network apparatus D.

The transmission units A2-1 to A2-3 up-convert the signals input from the main base station control unit A1 into signals of a wireless frequency band of CCs, which have been associated in advance, and transmit the up-converted signals through the transmission antennas A3-1 to A3-3.

The reception units A5-1 to A5-3 down-convert signals received through the reception antennas A4-1 to A4-3 into baseband signals, and output the down-converted signals to the main base station control unit A1.

In the base station apparatus B, the sub-base station control unit B1 controls each element of the base station apparatus B. Here, the sub-base station control unit B1 controls communication with the terminal apparatus C according to the control information received from the base station apparatus A. Furthermore, the sub-base station control unit B1 outputs the data addressed to the terminal apparatus C, which has been received from the base station apparatus A and divided in each CC, to the transmission units B2-1 to B2-3 that transmit signals using the CC.

Furthermore, the sub-base station control unit B1 transmits data of the signals, which are received from the terminal apparatus C and are input from the reception units B5-1 to B5-3 to the base station apparatus A.

The transmission units B2-1 to B2-3 up-convert the signals input from the sub-base station control unit B1 into signals of a wireless frequency band of CCs, which have been associated in advance, and transmit the up-converted signals through the transmission antennas B3-1 to B3-3.

The reception units B5-1 to B5-3 down-convert signals received through the reception antennas B4-1 to B4-3 into baseband signals, and output the down-converted signals to the sub-base station control unit B1.

In the terminal apparatus C, the reception units C2-1 to C2-3 down-convert signals received through the reception antennas C1-1 to C1-3 into baseband signals. The reception units C2-1 to C2-3 output the down-converted signals to the terminal control unit C3.

The terminal control unit C3 controls each element of the terminal apparatus C. Furthermore, the terminal control unit C3 integrates data of the signals input from the reception units C2-1 to C2-3. The terminal control unit C3 outputs the integrated data to an output unit (not illustrated) such as a display or a speaker of the terminal apparatus C.

The terminal control unit C3 measures a propagation quality based on reception signals from each base station apparatus, and transmits propagation quality information indicating the measured propagation quality to the base station apparatus A. Furthermore, the terminal control unit C3 divides data, which is input from an input unit such as an operation key or a microphone of the terminal apparatus C, in each CC to be used for transmission based on the ULCC allocation information received from the base station apparatus A. The terminal control unit C3 outputs signals of the data divided in each CC to the transmission units C4-1 to C4-3 that transmit signals using the CC.

The transmission units C4-1 to C4-3 up-convert the signals input from the terminal control unit C3 into signals of a wireless frequency band of CCs, which have been associated in advance, and transmit the up-converted signals through the transmission antennas C5-1 to C5-3.

<Configuration of Each Control Unit>

Hereinafter, in the present embodiment, the main base station control unit A1 will be referred to as a main base station control unit 1a, the sub-base station control unit B1 will be referred to as a sub-base station control unit 1b, and the terminal control unit C3 will be referred to as a terminal control unit 1c.

Figure 3:
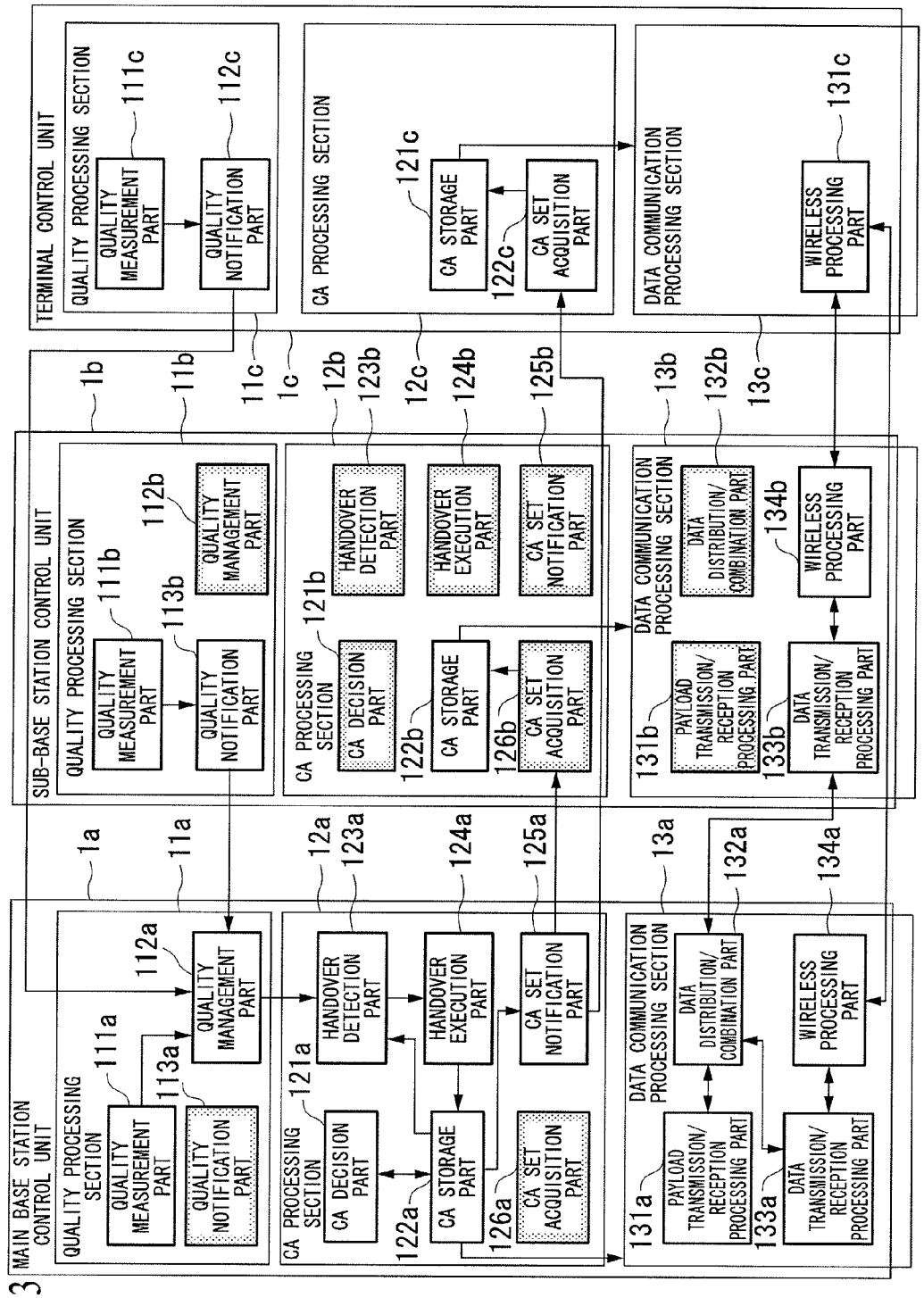
FIG. 3 is a schematic block diagram illustrating the configurations of a main base station control unit, a sub-base station control unit, and a terminal control unit according to the present embodiment.

FIG. 3 is a schematic block diagram illustrating the configurations of the main base station control unit 1a, the sub-base station control unit 1b, and the terminal control unit 1c according to the present embodiment. FIG. 3 is for explaining a configuration related to wireless communication among the configurations of the main base station control unit 1a, the sub-base station control unit 1b, and the terminal control unit 1c shown in FIG. 2.

In addition, the base station apparatuses A and B have the same configuration. However, in FIG. 3, the configuration of a control unit included in the base station apparatus A serving as the main base station apparatus will be described as the configuration of the main base station control unit 1a, and the configuration of a control unit included in the base station apparatus B serving as the sub-base station apparatus will be described as the configuration of the sub-base station control unit 1b (in FIG. 3, a non-hatched configuration will be described; a hatched configuration will be described with respect to a control unit of another base station apparatus).

The main base station control unit 1a includes a quality processing section 11a, a CA processing section 12a, and a data communication processing section 13a. The quality processing section 11a includes a quality measurement part 111a and a quality management part 112a. The CA processing section 12a includes a CA decision part 121a, a CA storage part 122a, a handover detection part 123a, a handover execution part 124a, and a CA set notification part 125a. The data communication processing section 13a includes a payload transmission/reception processing part 131a, a data distribution/combination part 132a, a data transmission/reception processing part 133a, and a wireless processing part 134a.

The sub-base station control unit 1b includes a quality processing section 11b, a CA processing section 12b, and a data communication processing section 13b. The quality processing section 11b includes a quality measurement part 111b and a quality notification part 113b. The CA processing section 12b includes a CA storage part 122b and a CA set acquisition part 126b. The data communication processing section 13b includes a data transmission/reception processing part 133b and a wireless processing part 134b.

The terminal control unit 1c includes a quality processing section 11c, a CA processing section 12c, and a data communication processing section 13c. The quality processing section 11c includes a quality measurement part 111c and a quality notification part 112c. The CA processing section 12c includes a CA storage part 121c and a CA set notification part 122c. The data communication processing section 13c includes a wireless processing part 131c.

In the main base station control unit 1a, the quality measurement part 111a measures a propagation quality of each sub-carrier for uplink communication to the base station apparatus A from the terminal apparatus C. Furthermore, the quality measurement part 111a measures a communication traffic amount in the base station apparatus A. The quality measurement part 111a outputs, to the quality management part 112a, main UL propagation quality information indicating the measured propagation quality, and main traffic information indicating the measured traffic amount.

The quality management part 112a stores the main UL propagation quality information and the main traffic information, which are input from the quality measurement part 111a, in a storage part (not illustrated). Furthermore, the quality management part 112a receives sub-UL propagation path quality information indicating a propagation path quality in uplink communication to the base station apparatus B from the terminal apparatus C, and sub-traffic information indicating a communication traffic amount in the base station apparatus B from the quality notification part 113b of the base station apparatus B, and stores the received information in the storage part. Furthermore, the quality management part 112a receives DL propagation path quality information indicating a propagation path quality in downlink communication from each base station apparatus to the terminal apparatus C from the terminal apparatus C, and stores the received information in the storage part.

The quality management part 112a reads the main UL propagation quality information, the main traffic information, the sub-UL propagation path quality information, the sub-traffic information, and the DL propagation path quality information from the storage part, and outputs the read information to the CA decision part 121a and the handover detection part 123a.

The CA decision part 121a acquires data amount information received from the core network apparatus D, wireless resource information to be used for communication by the base station apparatus, and communication capability information of the terminal apparatus C. The CA decision part 121a determines whether to perform communication using CA technology based on the acquired amount information and the information input from the quality management part 112a, and allocates CCs.

In detail, the CA decision part 121a determines to perform the communication using CA technology when data indicated by the data amount information is large, communication capability information indicates that the communication using CA technology is possible, or a propagation quality indicated by the DL propagation path quality information is larger than a prescribed threshold value (when there is a CC with a high propagation quality). In addition, the propagation quality of a CC is obtained by averaging propagation qualities of sub-carriers included in the CC.

When the CA decision part 121a has determined to perform the communication using CA technology, the CA decision part 121a selects, as a main CC, a CC with the highest propagation quality indicated by the DL propagation path quality information. Here, when a traffic amount in each CC indicated by the main traffic amount information or the sub-traffic amount information is larger than the prescribed threshold value, the CA decision part 121a selects a CC with the highest propagation quality, which is to be used for communication by a base station apparatus in which a traffic amount is small, as the main CC.

The CA decision part 121a decides the number of CCs to be selected based on the data indicated by the data amount information. The CA decision part 121a selects sub-CCs by the decided number of CCs in descending order of the propagation quality indicated by the DL propagation path quality information. Here, the CA decision part 121a selects the sub-CCs based on the wireless resource information, the main traffic amount information, and the sub-traffic amount information such that a communication traffic amount does not exceed the prescribed threshold value with respect to wireless resources (this will be referred to as a CA set selection process).

Through this CA set selection process, the CA decision part 121a decides allocation of CCs for downlink communication. Furthermore, the CA decision part 121a performs the CA set selection process using the main UL propagation path quality information and the sub-UL propagation path quality information, instead of the DL propagation path quality information, thereby deciding allocation of CCs for uplink communication. The CA decision part 121a generates DLCC allocation information and ULCC allocation information indicating the decided allocation of CCs, and stores the generated information in the CA storage part 122a.

The handover detection part 123a selects propagation path quality information of CCs of the DLCC allocation information stored in the CA storage part 122a from the propagation path quality information input from the quality management part 112a, and compares the selected propagation path quality information with propagation path quality information of other CCs. When it is determined that a propagation quality indicated by the propagation path quality information of other CCs is high, the handover detection part 123a determines that the terminal apparatus C is to be handed over. Here, when a traffic amount indicated by the main traffic amount information or the sub-traffic amount information is larger than the prescribed threshold value with respect to other CCs, the handover execution part 124a may determine that the terminal apparatus C is not handed over.

Furthermore, when it is determined that a propagation quality of a sub-CC is higher than a propagation quality of a main CC, the handover detection part 123a determines that the terminal apparatus C is to be handed over based on the selected propagation path quality information.

When the handover detection part 123a has determined that the terminal apparatus C is to be handed over, the handover execution part 124a performs the CA set selection process similarly to the CA decision part 121a, thereby deciding allocation of CCs for downlink communication.

When the DLCC allocation information and the ULCC allocation information stored in the CA storage part have been updated, the CA set notification part 125a notifies the sub-base station control unit 1b and the terminal control unit 1c of updated DLCC allocation information and ULCC allocation information (this will be referred to as a CA set notification).

The payload transmission/reception processing part 131a transmits data, which has been input from the data distribution/combination part 132a, to the core network apparatus D. Furthermore, the payload transmission/reception processing part 131a outputs data received from the core network apparatus D to the data distribution/combination part 132a.

The data distribution/combination part 132a divides the data, which has been input from the payload transmission/reception processing part 131a, into data of each CC indicated by the DLCC allocation information stored in the CA storage part 122a. In addition, the divided data includes data sequence information, which indicates a data sequence, as data control information. The data distribution/combination part 132a outputs data, which is to be transmitted on CCs of the base station apparatus A from the divided data of each CC, to the data transmission/reception processing part 133a. Furthermore, the data distribution/combination part 132a transmits data, which is to be transmitted on CCs of the base station apparatus B from the divided data of each CC, to the base station apparatus B.

Furthermore, the data distribution/combination part 132a integrates data of each CC input from the data transmission/reception processing part 133a and data of each CC received from the base station apparatus B, in the data sequence indicated by the data control information. The data distribution/combination part 132a outputs the integrated data to the payload transmission/reception processing part 131a.

The data transmission/reception processing part 133a outputs the data of each CC input from the data distribution/combination part 132a to the wireless processing part 134a.

Furthermore, the data transmission/reception processing part 133a outputs data of each CC input from the wireless processing part 134a to the data distribution/combination part 132a.

The wireless processing part 134a encodes and modulates the data of each CC input from the data transmission/reception processing part 133a, and maps the modulated signals to a frequency band of each CC. The wireless processing part 134a outputs the signals mapped to each CC to the transmission units A2-1 to A2-3 of FIG. 2.

Furthermore, the wireless processing part 134a demaps the signals input from the reception units A5-1 to A5-3, and demodulates the demapped signals. The wireless processing part 134a decodes the demodulated data and outputs the decoded data to the data transmission/reception processing part 133a.

In the sub-base station control unit 1b, the quality measurement part 111b measures a propagation quality of each sub-carrier for uplink communication to the base station apparatus B from the terminal apparatus C. Furthermore, the quality measurement part 111b measures a communication traffic amount in the base station apparatus B. The quality measurement part 111b outputs sub-UL propagation quality information indicating the measured propagation quality and sub-traffic information indicating the measured traffic amount to the quality notification part 113b.

The quality notification part 113b notifies the base station apparatus A of the sub-UL propagation quality information and the traffic amount input from the quality measurement part 111b.

The CA set acquisition part 126b stores the DLCC allocation information and the ULCC allocation information, which have been received from the base station apparatus A, in the CA storage part 122b.

The data transmission/reception processing part 133b receives the data of each CC from the base station apparatus A, and outputs the received data of each CC to the wireless processing part 134b.

Furthermore, the data transmission/reception processing part 133b transmits data of each CC input from the wireless processing part 134b to the base station apparatus A.

The wireless processing part 134b encodes and modulates the data of each CC input from the data transmission/reception processing part 133b, and maps the modulated signals to a frequency band of each CC. The wireless processing part 134b outputs the signals mapped to each CC to the transmission units B2-1 to B2-3 of FIG. 2.

Furthermore, the wireless processing part 134b demaps the signals input from the reception units B5-1 to B5-3, and demodulates the demapped signals. The wireless processing part 134b decodes the demodulated data and outputs the decoded data to the data transmission/reception processing part 133b.

In the terminal control unit 1c, the quality measurement part 111c measures a propagation quality of each sub-carrier for downlink communication to the terminal apparatus C from each base station apparatus. The quality measurement part 111c outputs DL propagation quality information indicating the measured propagation quality to the quality notification part 112c.

The quality notification part 112c notifies the base station apparatus A of the DL propagation quality information input from the quality measurement part 111c.

The CA set acquisition part 122c stores the DLCC allocation information and the ULCC allocation information, which have been received from the base station apparatus A, in the CA storage part 121c.

The wireless processing part 131c divides the data, which has been input from the input unit, into data of each CC indicated by the ULCC allocation information stored in the CA storage part 121c. In addition, the divided data includes data sequence information, which indicates a data sequence, as data control information. The wireless processing part 131c encodes and modulates the divided data of each CC, and maps the modulated signals to a frequency band of each CC. The wireless processing part 131c outputs the signals mapped to each CC to the transmission units C4-1 to C4-3 of FIG. 2.

Furthermore, the wireless processing part 131c demaps the signals input from the reception units C2-1 to C2-3, and demodulates the demapped signals. The wireless processing part 131c decodes the demodulated data. The wireless processing part 131c integrates the decoded data of each CC according to the data sequence indicated by the data control information, and outputs the integrated data to the output unit (not illustrated).

FIG. 4 is a schematic view illustrating an example of the DLCC allocation information stored in the base station apparatuses A and B according to the present embodiment. In addition, the DLCC allocation information is stored in the CA storage part 122a and the CA storage part 122b. As illustrated in FIG. 4, the DLCC allocation information has items such as a terminal identification number for identifying a terminal apparatus, a base station identification number for identifying a base station apparatus, a base station type indicating a main base station apparatus or a sub-base station apparatus, a DL CC identification number for identifying a CC of a downlink, and a CC type indicating a main CC or a sub-CC.

For example, the DLCC allocation information of the first item of FIG. 4 indicates information of a CC to be used for downlink communication to the terminal apparatus C indicated by the terminal identification number "C" from the base station apparatus A indicated by the base station identification number "A," and further indicates that the base station apparatus "A" is a "main" base station apparatus. Furthermore, the DLCC allocation information indicates that CC1 is a "sub" CC.

Furthermore, FIG. 4 illustrates that the base station apparatus A communicates with the terminal apparatus C using "CC1" and "CC2," and the base station apparatus B communicates with the terminal apparatus C using "CC3." Furthermore, FIG. 4 illustrates that "CC2" is a "main" CC, and the base station apparatus A using CC2 is a "main" base station apparatus. Furthermore, FIG. 4 illustrates that the base station apparatus B using only the "sub" CC is a "sub" base station apparatus.

In addition, since the allocation of the main CC and the sub-CC is different in each terminal apparatus, whether the base station apparatus A or B is the main base station apparatus is different in each terminal apparatus. For example, although not illustrated in FIG. 4, in terminal apparatuses other than the terminal apparatus, the base station apparatus A may be the sub-base station apparatus.

FIG. 5 is a schematic view illustrating an example of the DLCC allocation information stored in the terminal apparatus C according to the present embodiment. In addition, the DLCC allocation information is stored in the CA storage part 121c. As illustrated in FIG. 5, the DLCC allocation information has items such as a base station identification number, a base station type, a DL CC identification number, a CC type, and division information.

The DLCC allocation information of FIG. 5 is obtained by excluding the item of the terminal identification number from the DLCC allocation information of FIG. 4.

Hereinafter, a process performed by the main base station control unit 1a will be described.

Figure 6:
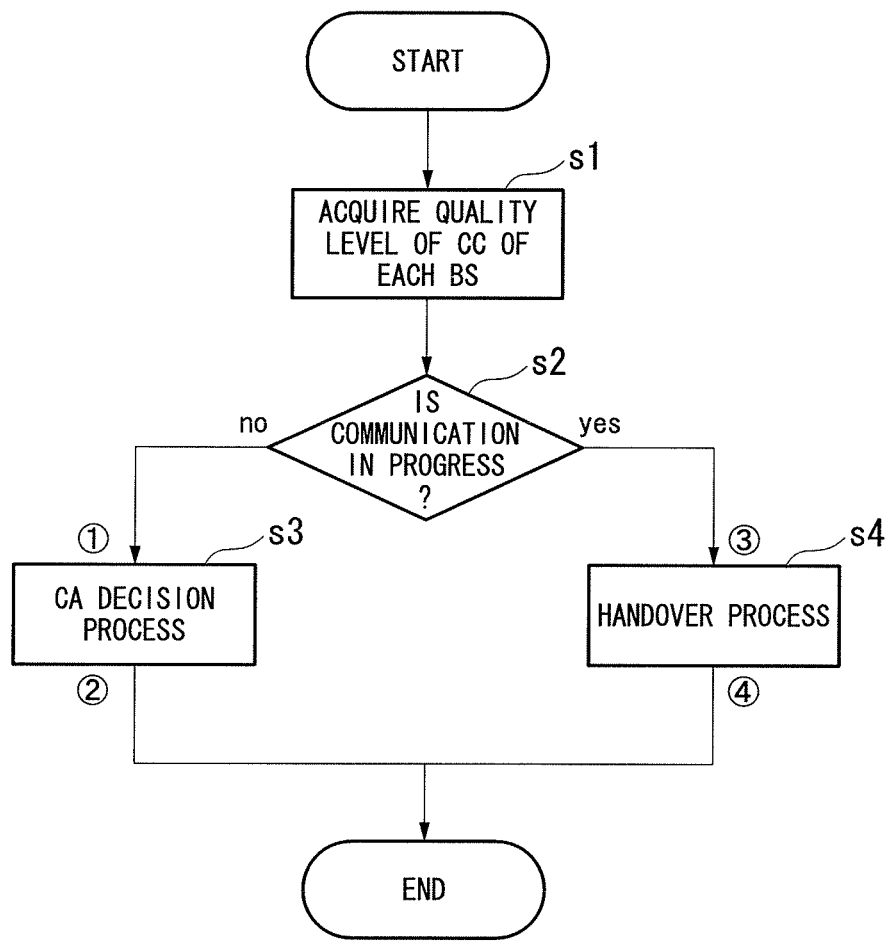
FIG. 6 is a sequence diagram illustrating an example of the operation of a main base station control unit according to the present embodiment.

FIG. 6 is a sequence diagram illustrating an example of the operation of the main base station control unit 1a according to the present embodiment. Furthermore, FIG. 6 illustrates a case in which the terminal apparatus C is powered on, is connected to a base station apparatus, and enters a standby state, or a case in which the terminal apparatus C is communicating with the base station apparatus.

(step s1) The main base station control unit 1a acquires the DL propagation path quality information. That is, the main base station control unit 1a acquires a propagation path quality (a quality level) in downlink communication to the terminal apparatus C from each base station apparatus. Then, the procedure proceeds to step s2.

(step s2) The main base station control unit 1a determines whether the base station apparatus is communicating with the terminal apparatus C. When it is determined that the base station apparatus is not communicating with the terminal apparatus C (no; a standby state), the procedure proceeds to step s3. Meanwhile, when it is determined that the base station apparatus is communicating with the terminal apparatus C (yes; communication is in progress), the procedure proceeds to step s4.

(step s3) The main base station control unit 1a performs the CA decision process. Details of the CA decision process will be described later. Then, the operation is completed.

(step s4) The main base station control unit 1a performs the handover process. Details of the handover determination process will be described later. Then, the operation is completed.

Figure 7:
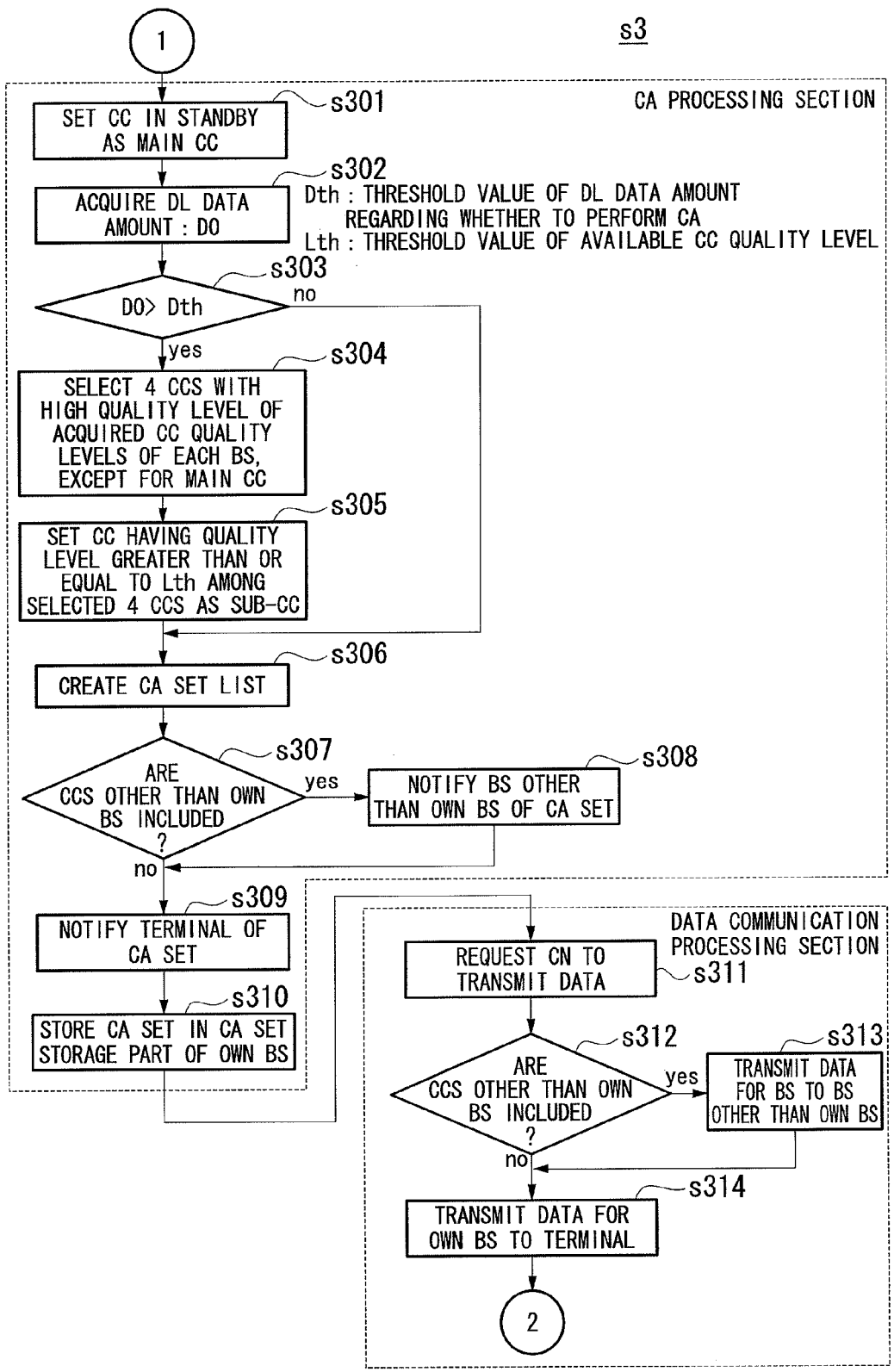
FIG. 7 is a sequence diagram illustrating an example of a CA decision process according to the present embodiment.

FIG. 7 is a sequence diagram illustrating an example of the CA decision process according to the present embodiment. That is, FIG. 7 illustrates an example of step s3 of FIG. 6.

(step s301) The CA processing section 12a selects a CC when the terminal apparatus C is in the standby state as a main CC (CC2 of the base station apparatus A in FIG. 7). Then, the procedure proceeds to step s302.

(step s302) The CA processing section 12a acquires a data amount $D_0$ to be transmitted to the terminal apparatus C. Then, the procedure proceeds to step s303.

(step s303) The CA processing section 12a determines whether the data amount $D_0$ acquired in step s302 is larger than a threshold value $D_{th}$ stored in advance. When it is determined that the data amount $D_0$ is larger than the threshold value $D_{th}$ (yes), the procedure proceeds to step s304. Meanwhile, when it is determined that the data amount $D_0$ is less than or equal to the threshold value $D_{th}$ (no), the procedure proceeds to step s306.

(step s304) The CA processing section 12a selects CCs as sub-CC candidates in descending order of a propagation path quality indicated by the DL propagation path quality information. Here, the CA processing section 12a selects CCs having different DL CC identification numbers. In addition, in FIG. 7, a case in which four CCs are selected as sub-CC candidates will be described. In addition, in FIG. 7, a case in which the maximum number of CCs is set to "5" and four sub-CC candidates are selected will be described. However, the present invention is not limited thereto. For example, the number of sub-CC candidates to be selected may be less than or equal to 4, or greater than or equal to 6.

FIG. 8 is a schematic view illustrating an example of the DL propagation path quality information according to the present embodiment. In FIG. 8, the DL propagation path quality information indicates that quality levels are stored in base station identification numbers and DL CC identification numbers. Furthermore, quality level information represents that a quality is high in proportion to the value of a quality level.

FIG. 8, for example, illustrates that the quality level of CC1 of the base station apparatus A is "10" and the quality level of CC2 of the base station apparatus B is "6".

Returning to FIG. 7, in detail, the CA processing section 12a selects the sub-CC candidates from CCs other than CC2 (the main CC) of the base station apparatus. For example, in the case of the DL propagation path quality information illustrated in FIG. 8, the CA processing section 12a selects CC1 and CC6 of the base station apparatus A and CC3 and CC4 of the base station apparatus B as the sub-CC candidates. Then, the procedure proceeds to step s305.

(step s305) The CA processing section 12a selects sub-CCs, which have quality levels equal to more than a prescribed threshold value $L_{th}$, from the four sub-CCs selected in step s304. For example, when $L_{th}$ is 5, the CA processing section 12a selects CC1 and CC6 of the base station apparatus A and CC3 of the base station apparatus B. Then, the procedure proceeds to step s306.

(step s306) The CA processing section 12a generates a CA set list indicating information on the main CC and the sub-CCs selected by the CA processing section 12a. Then, the procedure proceeds to step s307.

(step s307) The CA processing section 12a determines whether there are CCs used by other base station apparatuses in the CCs of the CA set list. When it is determined that there are no CCs used by the other base station apparatuses, that is, when there are only CCs used by an own apparatus (no), the procedure proceeds to step s309. Meanwhile, when it is determined that there are the CCs used by the other base station apparatuses (yes), the procedure proceeds to step s308.

(step s308) The CA processing section 12a (the CA set notification part 125a) notifies the other base station apparatuses using the CCs of the CA set list of the CA set list generated in step s306 (CA set notification). Then, the procedure proceeds to step s309.

(step s309) The CA processing section 12a notifies the terminal apparatus C of the CA set list generated in step s306. Then, the procedure proceeds to step s310.

(step s310) The CA processing section 12a stores the CA set list generated in step s306 in the CA storage part 122a. Then, the procedure proceeds to step s311.

(step s311) The data communication processing section 13a requests the core network apparatus D to transmit data addressed to the terminal apparatus C. The data communication processing section 13a receives and divides the requested data. Then, the procedure proceeds to step s312.

(step s312) The data communication processing section 13a performs the same determination as in step s307. When it is determined that there are no CCs used by the other base station apparatuses (no), the procedure proceeds to step s314. Meanwhile, when it is determined that there are CCs used by the other base station apparatuses, the procedure proceeds to step s313.

(step s313) The data communication processing section 13a transmits data, which is to be transmitted using CCs of the other base station apparatuses among the data divided in step s311, to the other base station apparatuses using the CCs of the CA set list. Then, the procedure proceeds to step s314.

(step s314) The data communication processing section 13a transmits data, which is to be transmitted using CCs of the own apparatus among the data divided in step s311, using the CCs. Then, the operation is completed.

Figure 9:
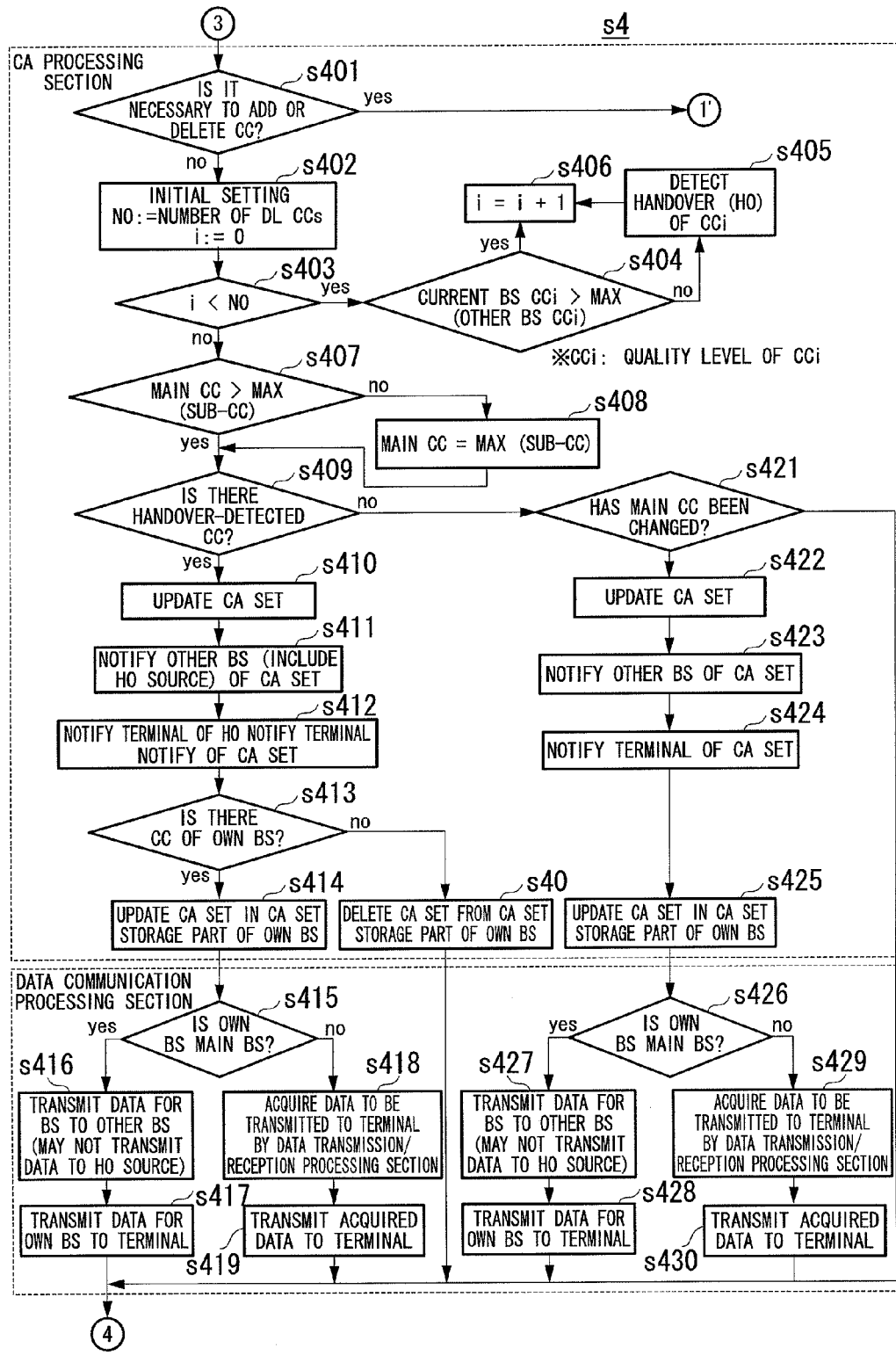
FIG. 9 is a sequence diagram illustrating an example of a handover process according to the present embodiment.

FIG. 9 is a sequence diagram illustrating an example of the handover process according to the present embodiment. That is, FIG. 9 illustrates an example of step s4 of FIG. 6.

(step s401) The CA processing section 12a determines whether it is necessary to add or delete CCs based on the propagation path quality information. When it is determined that it is not necessary to add or delete the CCs (no), the procedure proceeds to step s402. Meanwhile, when it is determined that it is necessary to add or delete the CCs (yes), the same process as in FIG. 7 is performed.

(step s402) The CA processing section 12a substitutes the number of CCs of the CA set list for $N_0$, and substitutes 0 for a base station identification number i. Then, the procedure proceeds to step s403.

(step s403) The CA processing section 12a determines whether i is smaller than $N_0$. When it is determined that i is smaller than $N_0$ (yes), the procedure proceeds to step s404. Meanwhile, when it is determined that i is greater than or equal to $N_0$ (no), the procedure proceeds to step s407.

(step s404) The CA processing section 12a determines whether the quality level of a CCi of the own apparatus is larger than a maximum value of the quality level of a CCi of the other base station apparatuses. When it is determined that the quality level of the CCi of the own apparatus is larger than the maximum value of the quality level of the CCi of the other base station apparatuses (yes), the procedure proceeds to step s406. Meanwhile, when it is determined that the quality level of the CCi of the own apparatus is less than or equal to the maximum value of the quality level of the CCi of the other base station apparatuses (no), the procedure proceeds to step s405.

(step s405) The CA processing section 12a detects handover of the CCi. Then, the procedure proceeds to step s406. Here, if handover to a base station apparatus using a CC having a quality level simply reaching a maximum value is performed, for example, handover may be frequently performed when the quality levels of CCs of base station apparatuses are approximately equal to each other. In order to prevent such a problem, for example, it is preferable to determine a maximum value by applying an averaging process of determining to perform handover when the number of times the quality level of a CC reaches the maximum value in a certain period of time exceeds a reference number.

(step s406) The CA processing section 12a substitutes i+1 for i. Then, the procedure proceeds to step s403.

(step s407) The CA processing section 12a determines whether the quality level of the main CC is larger than a maximum value of the quality level of the sub-CC. When it is determined that the quality level of the main CC is larger than the maximum value of the quality level of the sub-CC (yes), the procedure proceeds to step s409. Meanwhile, when it is determined that the quality level of the main CC is less than or equal to the maximum value of the quality level of the sub-CC (no), the procedure proceeds to step s408.

(step s408) The CA processing section 12a changes the main CC to a sub-CC having a quality level reaching the maximum value. That is, the CA processing section 12a changes information indicating the main CC in the CA set list. Then, the procedure proceeds to step s409. In addition, the averaging process may be applied in steps s407 and s408.

(step s409) The CA processing section 12a determines whether there is a handover-detected CC in step s405. When it is determined that there is the handover-detected CC (yes), the procedure proceeds to step s410. Meanwhile, when there is no handover-detected CC (no), the procedure proceeds to step s421.

(step s410) The CA processing section 12a changes the CCi of the CA set list to the handover-detected CCi in step s405. Then, the procedure proceeds to step s411.

(step s411) The CA processing section 12a notifies other base station apparatuses of the CA set list changed in step s408 or step s410 (CA set notification). Here, the other base station apparatuses notified of the CA set list include a base station apparatus using the CCi changed in step s410 and a base station apparatus using the CCi before being changed. Then, the procedure proceeds to step s412.

(step s412) The CA processing section 12a notifies the terminal apparatus C of the CA set list changed in step s408 or step s410. Then, the procedure proceeds to step s413.

(step s413) The CA processing section 12a determines whether there are CCs used by the own apparatus in the CCs of the CA set list. When it is determined that there are the CCs used by the own apparatus (yes), the procedure proceeds to step s414. Meanwhile, when there are no CCs used by the own apparatus (no), the procedure proceeds to step s420.

(step s414) The CA processing section 12a stores the CA set list changed in step s408 or step s410 in the CA storage part 122a. Then, the procedure proceeds to step s415.

(step s415) The data communication processing section 13a determines whether there is a main CC in the CCs used by the own apparatus. When it is determined that there is the main CC (yes), the procedure proceeds to step s416. Meanwhile, when there is no main CC (no), the procedure proceeds to step s418.

(step s416) The data communication processing section 13a transmits data, which is to be transmitted using the CCs of the other base station apparatuses among the data divided after being acquired from the core network apparatus D, to the other base station apparatuses using the CCs of the CA set list. Then, the procedure proceeds to step s417.

(step s417) The data communication processing section 13a transmits data to the terminal apparatus C using the CCs of the CA set list. Then, the operation is completed.

(step s418) The data communication processing section 13a acquires data from the other base station apparatuses using the main CC. Then, the procedure proceeds to step s419.

(step s419) The data communication processing section 13a transmits data to the terminal apparatus C using the CCs of the CA set list. Then, the operation is completed.

(step s420) The CA processing section 12a deletes the CA set list. Then, the operation is completed.

(step s421) The CA processing section 12a determines whether the main CC has been changed in step s408. When it is determined that the main CC has been changed (yes), the procedure proceeds to step s422. Meanwhile, when the main CC has not been changed (no), the operation is completed.

(step s422) The CA processing section 12a stores the CA set list changed in step s408 or step s410 in the CA storage part 122a. Then, the procedure proceeds to step s423.

(step s423) The CA processing section 12a notifies the other base station apparatuses of the CA set list changed in step s408 or step s422 (CA set notification). Then, the procedure proceeds to step s424.

(step s424) The CA processing section 12a notifies the terminal apparatus C of the CA set list changed in step s408 or step s422. Then, the procedure proceeds to step s425.

(step s425) The CA processing section 12a stores the CA set list changed in step s408 or step s422 in the CA storage part 122a. Then, the procedure proceeds to step s426.

(step s426) The data communication processing section 13a determines whether there is a main CC in the CCs used by the own apparatus. When it is determined that there is the main CC (yes), the procedure proceeds to step s427. Meanwhile, when there is no main CC (no), the procedure proceeds to step s429. In this case (in the case of no), the data communication processing section 13a becomes the data communication processing section 13b.

(step s427) The data communication processing section 13a transmits data, which is to be transmitted using the CCs of the other base station apparatuses among the data divided after being acquired from the core network apparatus D, to the other base station apparatuses using the CCs of the CA set list. Then, the procedure proceeds to step s428.

(step s428) The data communication processing section 13a transmits data to the terminal apparatus C using the CCs of the CA set list. Then, the operation is completed.

(step s429) The data communication processing section 13b acquires data from the other base station apparatuses using the main CC. Then, the procedure proceeds to step s430.

(step s430) The data communication processing section 13b transmits data to the terminal apparatus C using the CCs of the CA set list. Then, the operation is completed.

Figure 10:
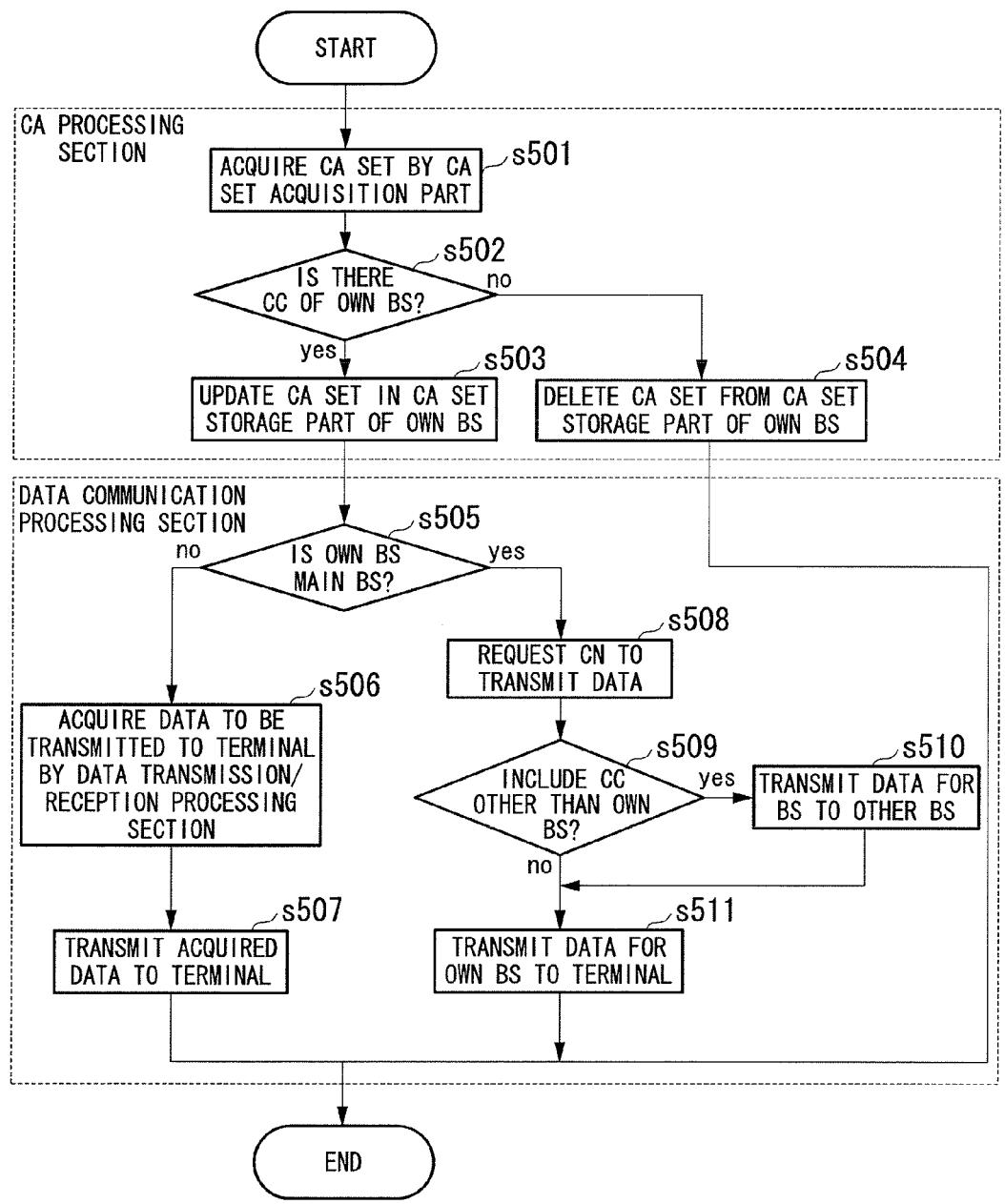
FIG. 10 is a schematic view illustrating an example of a process performed by a sub-base station control unit.

FIG. 10 is a schematic view illustrating an example of the process performed by the sub-base station control unit 1b.

(step s501) The CA processing section 12b acquires the CA set list from the CA set notification. Then, the procedure proceeds to step s502.

(step s502) The CA processing section 12b determines whether there are CCs used by the own apparatus in the CCs of the CA set list. When it is determined that there are the CCs used by the own apparatus (yes), the procedure proceeds to step s503. Meanwhile, when there are no CCs used by the own apparatus (no), the procedure proceeds to step s504.

(step s503) The CA processing section 12b stores the CA set list acquired in step s501 in the CA storage part 122b. Then, the procedure proceeds to step s505.

(step s504) The CA processing section 12b deletes the CA set list. Then, the operation is completed.

(step s505) The data communication processing section 13b determines whether there is a main CC in the CCs used by the own apparatus. When it is determined that there is no main CC (no), the procedure proceeds to step s506. Meanwhile, when there is the main CC (yes), the procedure proceeds to step s508. In this case (in the case of yes), the data communication processing section 13b becomes the data communication processing section 13a.

(step s506) The data communication processing section 13b acquires data from the other base station apparatuses using the main CC. Then, the procedure proceeds to step s507.

(step s507) The data communication processing section 13b transmits the data to the terminal apparatus C using the CCs of the CA set list. Then, the operation is completed.

(step s508) The data communication processing section 13a requests the core network apparatus D to transmit data addressed to the terminal apparatus C. The data communication processing section 13a receives and divides the requested data. Then, the procedure proceeds to step s509.

(step s509) The data communication processing section 13a determines whether there are CCs used by the other base station apparatuses in the CCs of the CA set list stored in step s503. When it is determined that there are no CCs used by the other base station apparatuses (no), the procedure proceeds to step s510. Meanwhile, when it is determined that there are the CCs used by the other base station apparatuses, the procedure proceeds to step s511.

(step s510) The data communication processing section 13a transmits data, which is to be transmitted using CCs of the other base station apparatuses among the data divided in step s508, to the other base station apparatuses using the CCs of the CA set list. Then, the procedure proceeds to step s511.

(step s511) The data communication processing section 13a transmits data, which is to be transmitted using CCs of the own apparatus among the data divided in step s508, using the CCs. Then, the operation is completed.

<Handover Process of Sub-CC>

Hereinafter, the handover process will be described in detail. First, a description will be provided for a case in which a sub-CC is switched between the base station apparatuses A and B (this will be referred to as sub-CC handover).

Figure 11:
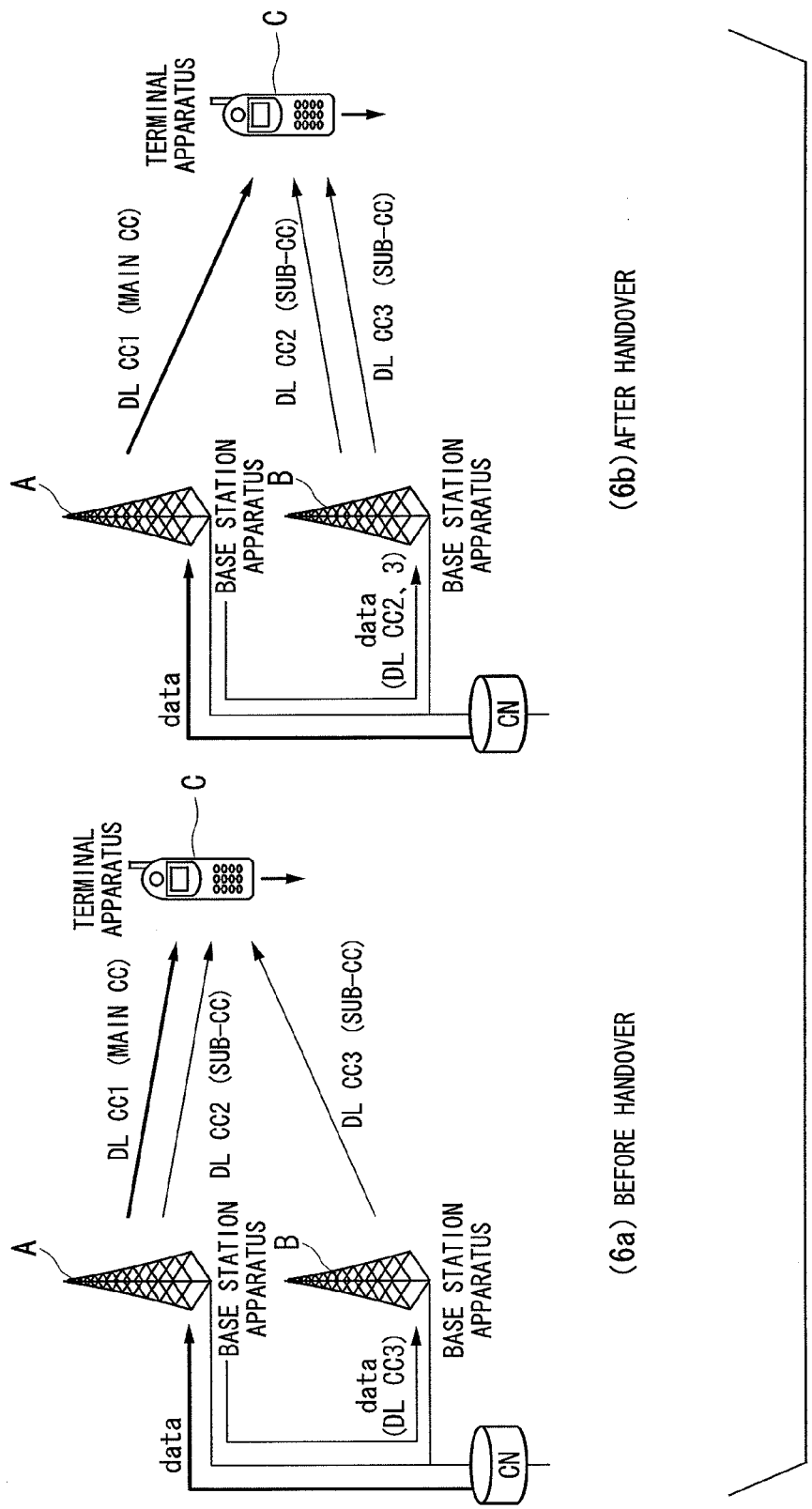
FIG. 11 is a schematic view illustrating an example of a handover process of a sub-CC according to the present embodiment.

FIG. 11 is a schematic view illustrating an example of the handover process of a sub-CC according to the present embodiment. 6a of FIG. 11 illustrates the state of the communication system before handover, and 6b of FIG. 11 illustrates the state of the communication system after the handover.

6a of FIG. 11 illustrates that the terminal apparatus C performs downlink communication using CC1 and CC2 from the base station apparatus A before handover. Furthermore, 6a of FIG. 11 illustrates that the terminal apparatus C performs downlink communication using CC3 from the base station apparatus B. Here, CC1 is a main CC and CC2 and CC3 are sub-CCs.

Furthermore, 6a of FIG. 11 illustrates that data is transmitted from the core network apparatus D to the base station apparatus A serving as a main base station apparatus and the base station apparatus A divides the data. Furthermore, 6a of FIG. 11 illustrates that the base station apparatus A transmits data of signals, which are to be allocated to CC2 and CC3 from the divided data, to the base station apparatus B serving as a sub-base station apparatus.

6b of FIG. 11 illustrates that the terminal apparatus C performs downlink communication using CC1 from the base station apparatus A after the handover. Furthermore, 6b of FIG. 11 illustrates that the terminal apparatus C performs downlink communication using CC2 and CC3 from the base station apparatus B. Here, CC1 is a main CC and CC2 and CC3 are sub-CCs.

Furthermore, 6b of FIG. 11 illustrates that data is transmitted from the core network apparatus D to the base station apparatus A serving as a main base station apparatus and the base station apparatus A divides the data. Furthermore, 6b of FIG. 11 illustrates that the base station apparatus A transmits data of signals, which are to be allocated to CC3 from the divided data, to the base station apparatus B serving as a sub-base station apparatus.

Figure 12:
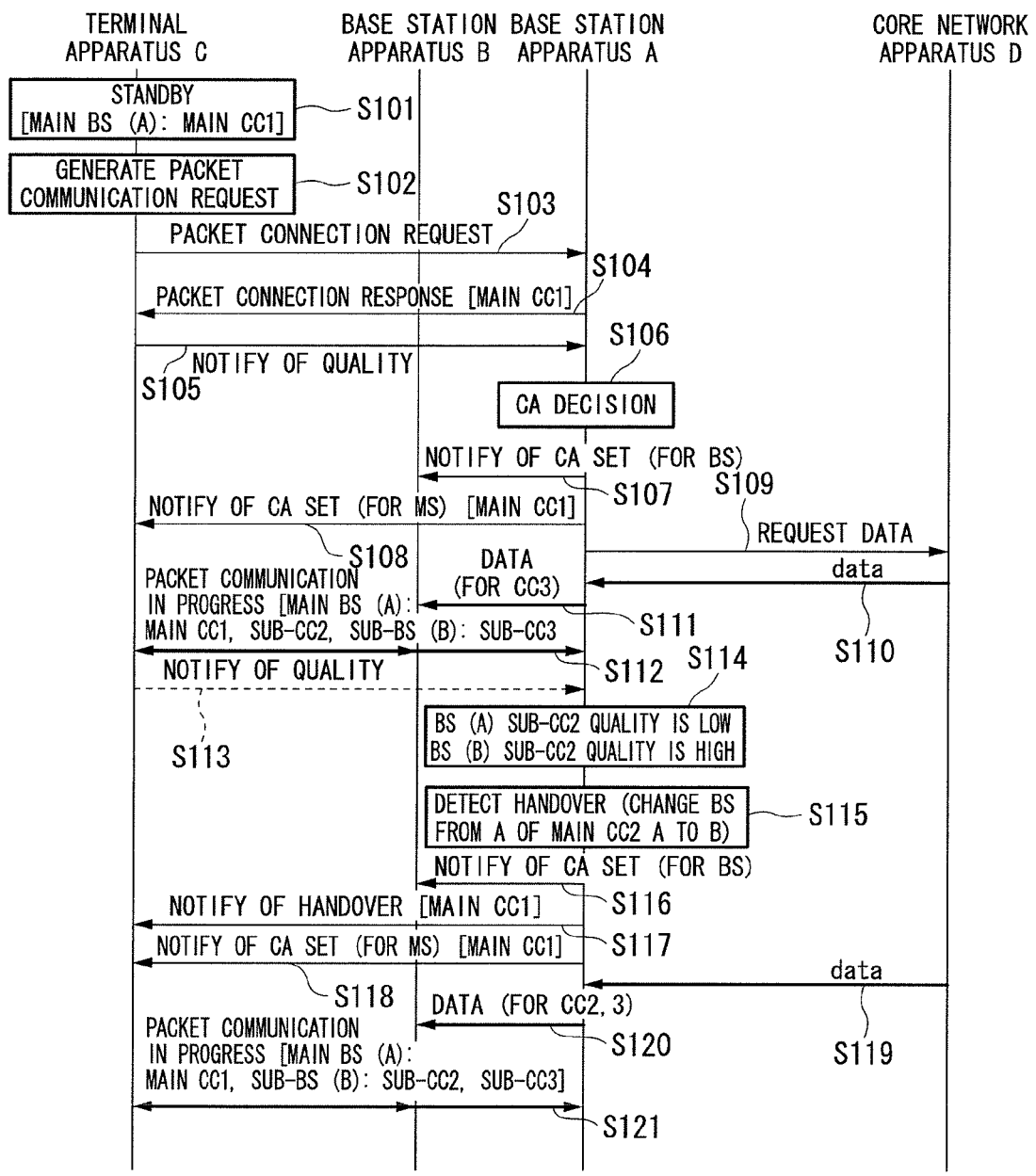
FIG. 12 is a sequence diagram illustrating an example of the operation of a communication system according to the present embodiment.

FIG. 12 is a sequence diagram illustrating an example of the operation of the communication system according to the present embodiment. FIG. 12 illustrates an operation when the terminal apparatus C is connected (including handover) to the base station apparatuses A and B and performs communication. Furthermore, FIG. 12 illustrates the operation of the communication system when performing the handover process of the sub-CCs illustrated in FIG. 11.

(step S101) The terminal apparatus C, for example, is powered on, and then performs cell search to be connected to the base station apparatus A. Here, the number of CCs used for the connection by the terminal apparatus C is 1 (CC1 in the example of FIG. 12). The terminal apparatus C sets the base station apparatus A as a base station apparatus of a position registration destination, performs position registration, and then enters a communication standby state using CC1. In addition, when the CA set selection process has already been performed, the terminal apparatus C enters a communication standby state using a main CC (CC1 in the example of FIG. 12).

Furthermore, the terminal apparatus C periodically transmits DL propagation quality information to the base station apparatus A using CC1. Then, the procedure proceeds to step S102.

(step S102) The terminal apparatus C generates a packet communication request. Then, the procedure proceeds to step S103.

(step S103) In the terminal apparatus C, the wireless processing part 131c transmits a packet connection request. Then, the procedure proceeds to step S104.

(step S104) The base station apparatus A transmits a packet connection response to the terminal apparatus C as a response for the packet connection request of step S103. In addition, the packet connection response is transmitted using CC1 which is a main CC. Then, the procedure proceeds to step S105.

(step S105) The terminal apparatus C measures a propagation quality and transmits propagation quality information indicating the measured propagation quality to the base station apparatus A. Then, the procedure proceeds to step S106.

(step S106) The base station apparatus A determines whether to perform communication using CA technology. An example of FIG. 12 is an example in which it is determined to perform the communication using CA technology. The base station apparatus A performs the CA set selection process and generates the DLCC allocation information and the ULCC allocation information. The DLCC allocation information indicates that the base station apparatus A communicates with the terminal apparatus C using CC1 (a main CC) and CC2 (a sub-CC), and the base station apparatus B communicates with the terminal apparatus C using CC3 (a sub-CC) (refer to 6a of FIG. 11). Then, the procedure proceeds to step S107.

(step S107) The base station apparatus A transmits a CA set notification including the generated DLCC allocation information and ULCC allocation information to the base station apparatus B. In addition, the DLCC allocation information and the ULCC allocation information are stored in the CA storage part 122a of the base station apparatus A and the CA storage part 122b of the base station apparatus B in FIG. 3. Then, the procedure proceeds to step S108.

(step S108) The base station apparatus A transmits the CA set notification including the generated DLCC allocation information and ULCC allocation information to the terminal apparatus C. In addition, the CA set notification is transmitted using CC1 which is a main CC. Furthermore, the DLCC allocation information and the ULCC allocation information are stored in the CA storage part 121c of the terminal apparatus C in FIG. 3. By the above operation, the DLCC allocation information and the ULCC allocation information are shared by the base station apparatuses A and B and the terminal apparatus C. Then, the procedure proceeds to step S109.

(step S109) The base station apparatus A transmits a data request for requesting data to the core network apparatus D. Then, the procedure proceeds to step S110.

(step S110) The core network apparatus D transmits the data to the base station apparatus A. In this way, packet communication is started. Then, the procedure proceeds to step S111.

(step S111) In the base station apparatus A, the payload transmission/reception processing part 131a of FIG. 3 receives the data transmitted in step S110. Furthermore, the data distribution/combination part 132a divides the received data into data of each CC. The data distribution/combination part 132a transmits data, which is to be transmitted on a CC (CC3) of the base station apparatus B from the divided data of each CC, to the base station apparatus B. Then, the procedure proceeds to step S112.

(step S112) The base station apparatus A transmits data of CC1 and CC2 among the data divided in step S111 to the terminal apparatus C using CC1 and CC2. The base station apparatus B receives the data transmitted from the base station apparatus A in step S111, and transmits data of CC3 to the terminal apparatus C using CC3. In this way, the terminal apparatus C simultaneously communicates with the base station apparatuses A and B using the CA technology. Then, the procedure proceeds to step S113.

(step S113) The terminal apparatus C measures a propagation quality, and transmits propagation quality information indicating the measured propagation quality to the base station apparatus A. Then, the procedure proceeds to step S114.

(step S114) As illustrated in FIG. 11, it is assumed that the terminal apparatus C moves from the position of 6a of FIG. 11 to the position of 6b of FIG. 11, so that the propagation quality of communication to the terminal apparatus C from the base station apparatus B is higher than the propagation quality of communication to the terminal apparatus C from the base station apparatus A with respect to CC2. Then, the procedure proceeds to step S115.

(step S115) In the base station apparatus A, the handover detection part 123a of FIG. 3 determines that the terminal apparatus C is to be handed over. That is, the handover detection part 123a detects handover.

Furthermore, the handover execution part 124a performs the CA set selection process, thereby deciding allocation of CCs for downlink communication. The handover execution part 124a generates DLCC allocation information indicating the decided allocation of CCs. The DLCC allocation information indicates that, in the example of 6b of FIG. 11, the base station apparatus A communicates with the terminal apparatus C using CC1 (a main CC), and the base station apparatus B communicates with the terminal apparatus C using CC2 (a sub-CC) and CC3 (a sub-CC). That is, the handover execution part 124a decides to change a base station apparatus using CC2 for communication from the base station apparatus A to the base station apparatus B. Then, the procedure proceeds to step S116.

(step S116) The base station apparatus A transmits a CA set notification including the generated DLCC allocation information to the base station apparatus B. In addition, instead of the DLCC allocation information stored in step S107, the DLCC allocation information is stored in the CA storage part 122a of the base station apparatus A and the CA storage part 122b of the base station apparatus B in FIG. 3. Then, the procedure proceeds to step S117.

(step S117) The base station apparatus A transmits a handover notification, which instructs handover to the terminal apparatus C, to the terminal apparatus C. In addition, the packet connection response is transmitted using CC1 which is a main CC. Then, the procedure proceeds to step S118.

(step S118) The base station apparatus A transmits the CA set notification including the generated DLCC allocation information to the terminal apparatus C. In addition, the CA set notification is transmitted using CC1 which is a main CC. Furthermore, instead of the DLCC allocation information stored in step S108, the DLCC allocation information is stored in the CA storage part 121c of the terminal apparatus C in FIG. 3. By the above operation, the DLCC allocation information indicating allocation of CCs of a handover destination is shared by the base station apparatuses A and B and the terminal apparatus C. The terminal apparatus C is handed over to the CC indicated by the DLCC allocation information. Then, the procedure proceeds to step S119.

(step S119) The core network apparatus D transmits data to the base station apparatus A. Then, the procedure proceeds to step S120.

(step S120) In the base station apparatus A, the payload transmission/reception processing part 131a of FIG. 3 receives the data transmitted in step S119. Furthermore, the data distribution/combination part 132a divides the received data into data of each CC. The data distribution/combination part 132a transmits data, which is to be transmitted on CCs (CC2 and CC3) of the base station apparatus B from the divided data of each CC, to the base station apparatus B. Then, the procedure proceeds to step S121.

(step S121) The base station apparatus A transmits data of CC1 among the data divided in step S120 to the terminal apparatus C using CC1. The base station apparatus B receives the data transmitted from the base station apparatus A in step S112, and transmits data of CC2 and CC3 to the terminal apparatus C using CC2 and CC3.

<Handover Process of Main CC>

Next, a description will be provided for a case in which a main CC is switched between the base station apparatuses A and B (this will be referred to as main CC handover).

Figure 13:
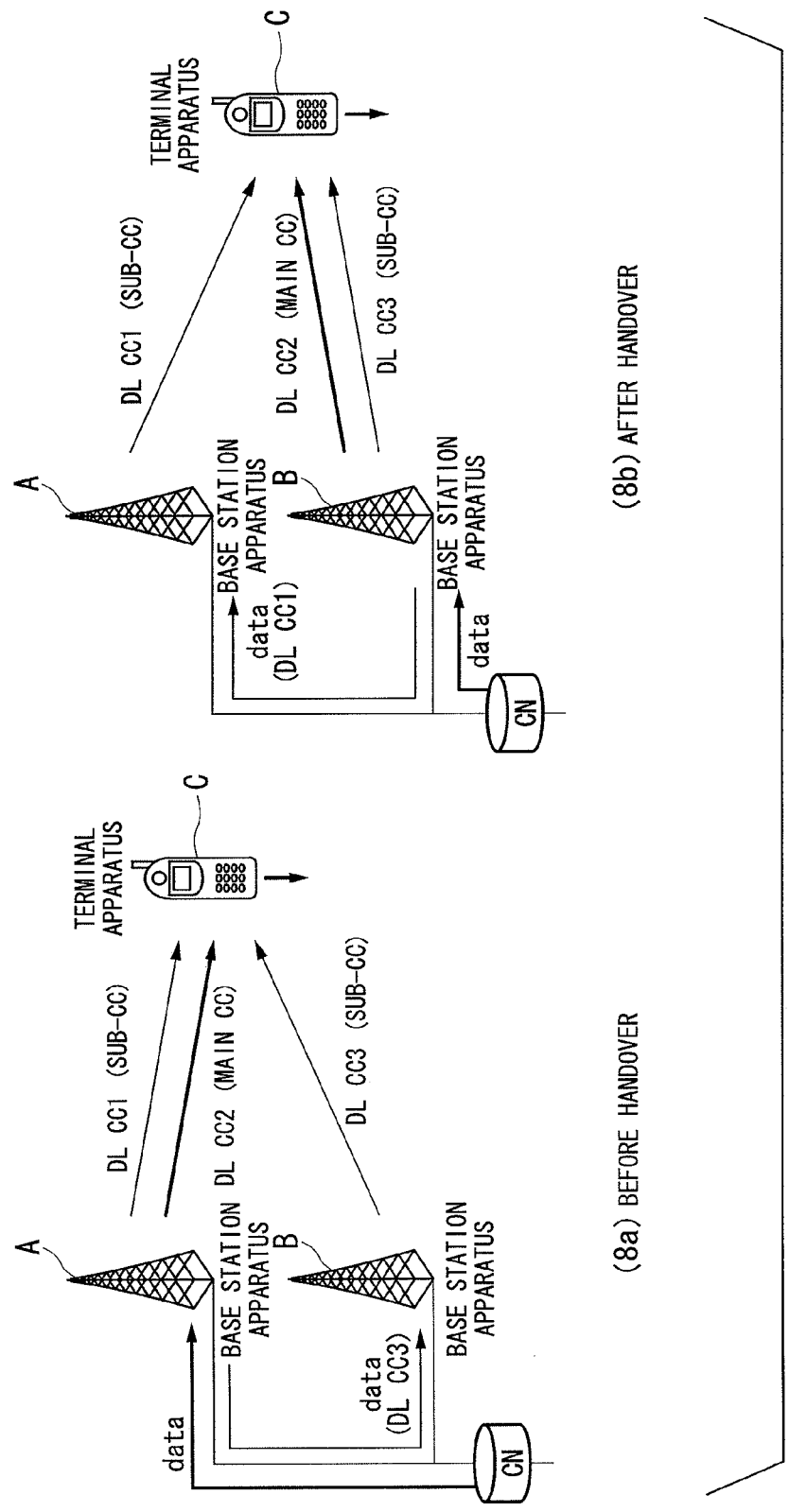
FIG. 13 is a schematic view illustrating an example of a handover process of a main-CC according to the present embodiment.

FIG. 13 is a schematic view illustrating an example of the handover process of the main-CC according to the present embodiment. 8a of FIG. 13 illustrates the state of the communication system before handover, and 8b of FIG. 13 illustrates the state of the communication system after the handover. FIG. 13 illustrates a case in which a main CC is handed over. Furthermore, with reference to FIG. 13, a description will be provided for a case in which there is a base station apparatus B' in addition to the base station apparatuses A and B. In addition, the configuration of the base station apparatus B' is the same as that of the base station apparatus B (refer to FIGS. 2 and 3).

8a of FIG. 13 illustrates that the terminal apparatus C performs downlink communication using CC1 and CC2 from the base station apparatus A before handover. Furthermore, 8a of FIG. 13 illustrates that the terminal apparatus C performs downlink communication using CC3 from the base station apparatus B. Here, CC1 is a sub-CC and CC2 and CC3 are main CCs.

Furthermore, 8a of FIG. 13 illustrates that data is transmitted from the core network apparatus D to the base station apparatus A serving as a main base station apparatus and the base station apparatus A divides the data. Furthermore, 8a of FIG. 13 illustrates that the base station apparatus A transmits data of signals, which are to be allocated to CC3 from the divided data, to the base station apparatus B serving as a sub-base station apparatus.

8b of FIG. 13 illustrates that the terminal apparatus C performs downlink communication using CC1 from the base station apparatus A after the handover. Furthermore, 8b of FIG. 13 illustrates that the terminal apparatus C performs downlink communication using CC2 and CC3 from the base station apparatus B. Here, CC1 and CC3 are sub-CCs and CC2 is a main CC.

Furthermore, 8b of FIG. 13 illustrates that data is transmitted from the core network apparatus D to the base station apparatus B serving as a main base station apparatus and the base station apparatus B divides the data. Furthermore, 8b of FIG. 13 illustrates that the base station apparatus B transmits data of signals, which are to be allocated to CC1 from the divided data, to the base station apparatus A serving as a sub-base station apparatus.

Figure 14:
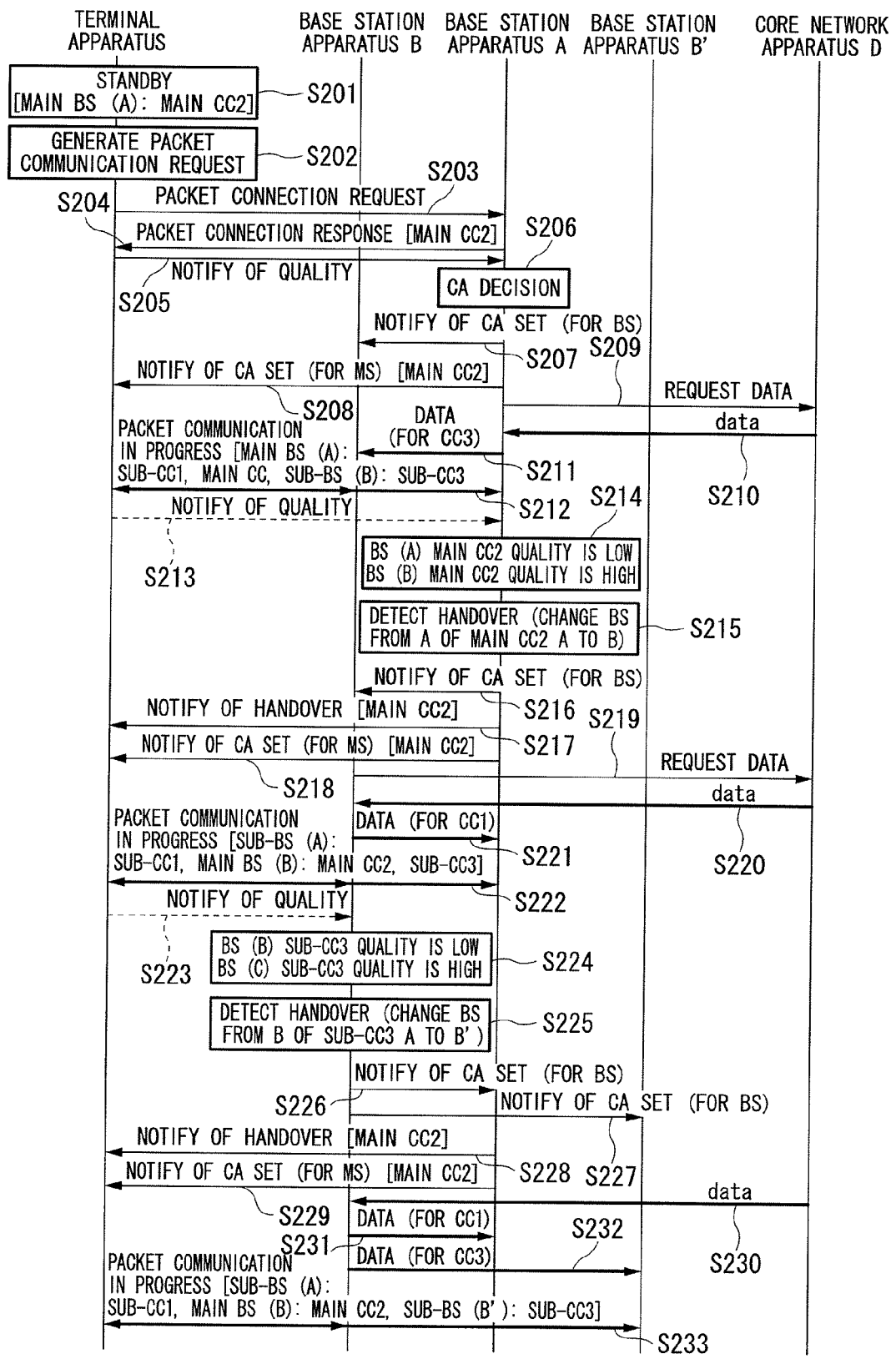
FIG. 14 is a sequence diagram illustrating another example of the operation of a communication system according to the present embodiment.

FIG. 14 is a sequence diagram illustrating another example of the operation of the communication system according to the present embodiment. FIG. 14 illustrates an operation when the terminal apparatus C is connected (including handover) to the base station apparatuses A and B and performs communication. Furthermore, FIG. 14 illustrates the operation when the communication system performs the handover process of the main CC in the example of FIG. 13.

(step S201) The terminal apparatus C, for example, is powered on, and then performs cell search to be connected to the base station apparatus A. The terminal apparatus C sets the base station apparatus A as a base station apparatus of a position registration destination, performs position registration, and then enters a communication standby state. In addition, FIG. 14 is an example when CC2 is used for communication. Furthermore, the terminal apparatus C periodically transmits DL propagation quality information to the base station apparatus A. Then, the procedure proceeds to step S202.

(step S202) The terminal apparatus C generates a packet communication request. Then, the procedure proceeds to step S203.

(step S203) The terminal apparatus C transmits a packet connection request. Then, the procedure proceeds to step S204.

(step S204) The base station apparatus A transmits a packet connection response to the terminal apparatus C as a response for the packet connection request of step S203. In addition, the packet connection response is transmitted using CC2 which is a main CC. Then, the procedure proceeds to step S205.

(step S205) The terminal apparatus C measures a propagation quality and transmits propagation quality information indicating the measured propagation quality to the base station apparatus A. Then, the procedure proceeds to step S206.

(step S206) The base station apparatus A determines whether or not to perform communication using CA technology. An example of FIG. 14 is an example in which it is determined to perform the communication using CA technology. The base station apparatus A performs the CA set selection process and generates the DLCC allocation information and the ULCC allocation information. The DLCC allocation information indicates that the base station apparatus A communicates with the terminal apparatus C using CC1 (a sub-CC) and CC2 (a main CC), and the base station apparatus B communicates with the terminal apparatus C using CC3 (a sub-CC) (refer to a of FIG. 13). Then, the procedure proceeds to step S207.

(step S207) The base station apparatus A transmits a CA set notification including the generated DLCC allocation information and ULCC allocation information to the base station apparatus B. In addition, the DLCC allocation information and the ULCC allocation information are stored in the CA storage part 122a of the base station apparatus A and the CA storage part 122b of the base station apparatus B in FIG. 3. Then, the procedure proceeds to step S208.

(step S208) The base station apparatus A transmits the CA set notification including the generated DLCC allocation information and ULCC allocation information to the terminal apparatus C. In addition, the CA set notification is transmitted using CC2 which is a main CC. Furthermore, the DLCC allocation information and the ULCC allocation information are stored in the CA storage part 121c of the terminal apparatus C in FIG. 3. By the above operation, the DLCC allocation information and the ULCC allocation information are shared by the base station apparatuses A and B and the terminal apparatus C. Then, the procedure proceeds to step S209.

(step S209) The base station apparatus A transmits a data request for requesting data to the core network apparatus D. Then, the procedure proceeds to step S210.

(step S210) The core network apparatus D transmits the data to the base station apparatus A. In this way, packet communication is started. Then, the procedure proceeds to step S211.

(step S211) In the base station apparatus A, the payload transmission/reception processing part 131a of FIG. 3 receives the data transmitted in step S210. Furthermore, the data distribution/combination part 132a divides the received data into data of each CC. The data distribution/combination part 132a transmits data, which is to be transmitted on a CC (CC3) of the base station apparatus B from the divided data of each CC, to the base station apparatus B. Then, the procedure proceeds to step S212.

(step S212) The base station apparatus A transmits data of CC1 and CC2 among the data divided in step S211 to the terminal apparatus C using CC1 and CC2. The base station apparatus B receives the data transmitted from the base station apparatus A in step S210, and transmits data of CC3 to the terminal apparatus C using CC3. Then, the procedure proceeds to step S213.

(step S213) The terminal apparatus C measures a propagation quality, and transmits propagation quality information indicating the measured propagation quality to the base station apparatus A. Then, the procedure proceeds to step S214.

(step S214) As illustrated in FIG. 13, it is assumed that the terminal apparatus C moves from the position of 8a of FIG. 13 to the position of 8b of FIG. 13, so that the propagation quality of communication to the terminal apparatus C from the base station apparatus B is higher than the propagation quality of communication to the terminal apparatus C from the base station apparatus A with respect to CC2. Then, the procedure proceeds to step S215.

(step S215) In the base station apparatus A, the handover detection part 123a of FIG. 3 determines that the terminal apparatus C is to be handed over. That is, the handover detection part 123a detects handover.

Furthermore, the handover execution part 124a performs the CA set selection process, thereby deciding allocation of CCs for downlink communication. The handover execution part 124a generates DLCC allocation information indicating the decided allocation of CCs. The DLCC allocation information indicates that, in the example of 8b of FIG. 13, the base station apparatus A communicates with the terminal apparatus C using CC1 (a sub-CC), and the base station apparatus B communicates with the terminal apparatus C using CC2 (a main CC) and CC3 (a sub-CC). That is, the handover execution part 124a decides to change a base station apparatus using CC2 for communication from the base station apparatus A to the base station apparatus B. Then, the procedure proceeds to step S216.

(step S216) The base station apparatus A transmits a CA set notification including the generated DLCC allocation information to the base station apparatus B. In addition, instead of the DLCC allocation information stored in step S206, the DLCC allocation information is stored in the CA storage part 122a of the base station apparatus A and the CA storage part 122b of the base station apparatus B in FIG. 3. Then, the procedure proceeds to step S217.

(step S217) The base station apparatus A transmits a handover notification, which instructs handover to the terminal apparatus C, to the terminal apparatus C. In addition, the packet connection response is transmitted using CC2 which is a main CC. Then, the procedure proceeds to step S218.

(step S218) The base station apparatus A transmits the CA set notification including the generated DLCC allocation information to the terminal apparatus C. In addition, the CA set notification is transmitted using CC2 which is a main CC. Furthermore, instead of the DLCC allocation information stored in step S208, the DLCC allocation information is stored in the CA storage part 121c of the terminal apparatus C in FIG. 3. The terminal apparatus C is handed over to the CC indicated by the DLCC allocation information. Then, the procedure proceeds to step S219.

(step S219) The configurations of the base station apparatuses A and B are changed from the non-hatched configuration of FIG. 3 to the hatched configuration. In this way, the base station apparatus B becomes a main base station apparatus and the base station apparatus A becomes a sub-base station apparatus.

The base station apparatus B transmits a data request for requesting data to the core network apparatus D. Then, the procedure proceeds to step S220.

(step S220) The core network apparatus D transmits the data to the base station apparatus B. Then, the procedure proceeds to step S221.

(step S221) In the base station apparatus B, the payload transmission/reception processing part 132b of FIG. 3 receives the data transmitted in step S220. Furthermore, the data distribution/combination part 132b divides the received data into data of each CC. The data distribution/combination part 132b transmits data, which is to be transmitted on a CC (CC1) of the base station apparatus A from the divided data of each CC, to the base station apparatus A. Then, the procedure proceeds to step S222.

(step S222) The base station apparatus B transmits data of CC2 and CC3 among the data divided in step S221 to the terminal apparatus C using CC2 and CC3. The base station apparatus A receives the data transmitted from the base station apparatus B in step S221, and transmits data of CC1 to the terminal apparatus C using CC1. Then, the procedure proceeds to step S223.

(step S223) The terminal apparatus C measures a propagation quality, and transmits propagation quality information indicating the measured propagation quality to the base station apparatus B. Then, the procedure proceeds to step S224.

(step S224) It is assumed that the position of the terminal apparatus C is moved, so that the propagation quality of communication to the terminal apparatus C from the base station apparatus B' is higher than the propagation quality of communication to the terminal apparatus C from the base station apparatus B with respect to CC3. Then, the procedure proceeds to step S225.

(step S225) In the base station apparatus B, the handover detection part 123b of FIG. 3 determines that the terminal apparatus C is to be handed over. That is, the handover detection part 123b detects handover.

Furthermore, the handover execution part 124b performs the CA set selection process, thereby deciding allocation of CCs for downlink communication. The handover execution part 124b generates DLCC allocation information indicating the decided allocation of CCs. The DLCC allocation information indicates that the base station apparatus B communicates with the terminal apparatus C using CC1 (a sub-CC), the base station apparatus B communicates with the terminal apparatus C using CC2 (a main CC), and the base station apparatus B' communicates with the terminal apparatus C using CC3 (a sub-CC). That is, the handover execution part 124b decides to change a base station apparatus using CC3 for communication from the base station apparatus B to the base station apparatus B'. Then, the procedure proceeds to step S226.

(step S226) The base station apparatus B transmits a CA set notification including the generated DLCC allocation information to the base station apparatus A. In addition, instead of the DLCC allocation information stored in step S216, the DLCC allocation information is stored in the CA storage part 122a of the base station apparatus A and the CA storage part 122b of the base station apparatus B in FIG. 3. Then, the procedure proceeds to step S227.

(step S227) The base station apparatus B transmits the CA set notification including the generated DLCC allocation information to the base station apparatus B'. In addition, the DLCC allocation information is stored in a CA storage part (corresponding to the CA storage part 122b of the base station apparatus B) of the base station apparatus B'. Then, the procedure proceeds to step S228.

(step S228) The base station apparatus B transmits a handover notification, which instructs handover to the terminal apparatus C, to the terminal apparatus C. In addition, the packet connection response is transmitted using CC2 which is a main CC. Then, the procedure proceeds to step S229.

(step S229) The base station apparatus B transmits the CA set notification including the generated DLCC allocation information to the terminal apparatus C. In addition, the CA set notification is transmitted using CC2 which is a main CC. Furthermore, instead of the DLCC allocation information stored in step S218, the DLCC allocation information is stored in the CA storage part 121c of the terminal apparatus C in FIG. 3. By the above operation, the DLCC allocation information indicating allocation of CCs of a handover destination is shared by the base station apparatuses A, B, and B' and the terminal apparatus C. The terminal apparatus C is handed over to the CC indicated by the DLCC allocation information. Then, the procedure proceeds to step S230.

(step S230) The core network apparatus D transmits data to the base station apparatus B. Then, the procedure proceeds to step S231.

(step S231) In the base station apparatus B, the payload transmission/reception processing part 132b of FIG. 3 receives the data transmitted in step S230. Furthermore, the data distribution/combination part 132b divides the received data into data of each CC. The data distribution/combination part 132b transmits data, which is to be transmitted on a CC (CC1) of the base station apparatus A from the divided data of each CC, to the base station apparatus A. Then, the procedure proceeds to step S232.

(step S232) In the base station apparatus B, the data distribution/combination part 132b transmits data, which is to be transmitted on a CC (CC3) of the base station apparatus B' from the divided data of each CC, to the base station apparatus B'. Then, the procedure proceeds to step S233.

(step S233) The base station apparatus A receives the data transmitted from the base station apparatus B in step S231, and transmits data of CC1 to the terminal apparatus C using CC1. The base station apparatus B transmits data of CC2 among the data divided in step S231 to the terminal apparatus C using CC2. The base station apparatus B' receives the data transmitted from the base station apparatus B in step S232, and transmits data of CC3 to the terminal apparatus C using CC3.

<Main CC Switching Handover Process>

Next, a description will be provided for a case in which a main CC of the base station apparatus A is switched to a sub-CC and a sub-CC of the base station apparatus B is switched to a main CC (this will be referred to as main CC switching handover).

Figure 15:
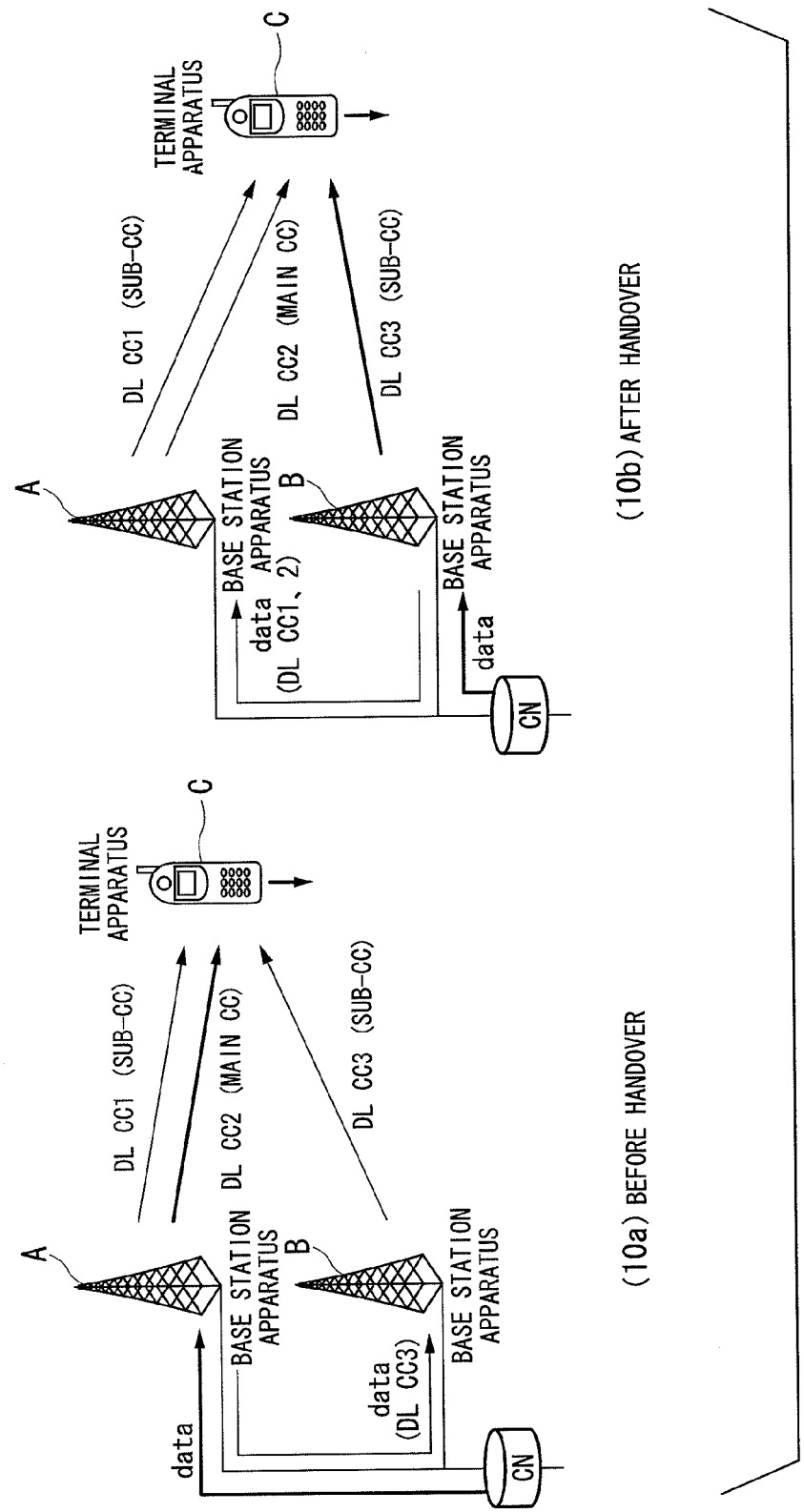
FIG. 15 is a schematic view illustrating an example of a main CC switching handover process according to the present embodiment.

FIG. 15 is a schematic view illustrating an example of the main CC switching handover process according to the present embodiment. 10a of FIG. 15 illustrates the state of the communication system before handover, and 10b of FIG. 15 illustrates the state of the communication system after the handover. FIG. 15 illustrates a case in which a main CC of the base station apparatus A is switched to a sub-CC and a sub-CC of the base station apparatus B is switched to a main CC.

Since 10a of FIG. 15 is the same as 8a of FIG. 13, a description thereof will be omitted here.

10b of FIG. 15 illustrates that the terminal apparatus C performs downlink communication using CC1 and CC2 from the base station apparatus A after the handover. Furthermore, 10b of FIG. 15 illustrates that the terminal apparatus C performs downlink communication using CC3 from the base station apparatus B. Here, CC1 and CC2 are sub-CCs and CC3 is a main CC.

Furthermore, 10b of FIG. 15 illustrates that data is transmitted from the core network apparatus D to the base station apparatus B serving as a main base station apparatus and the base station apparatus B divides the data. Furthermore, 10b of FIG. 15 illustrates that the base station apparatus B transmits data of signals, which are to be allocated to CC1 and CC2 from the divided data, to the base station apparatus A serving as a sub-base station apparatus.

Figure 16:
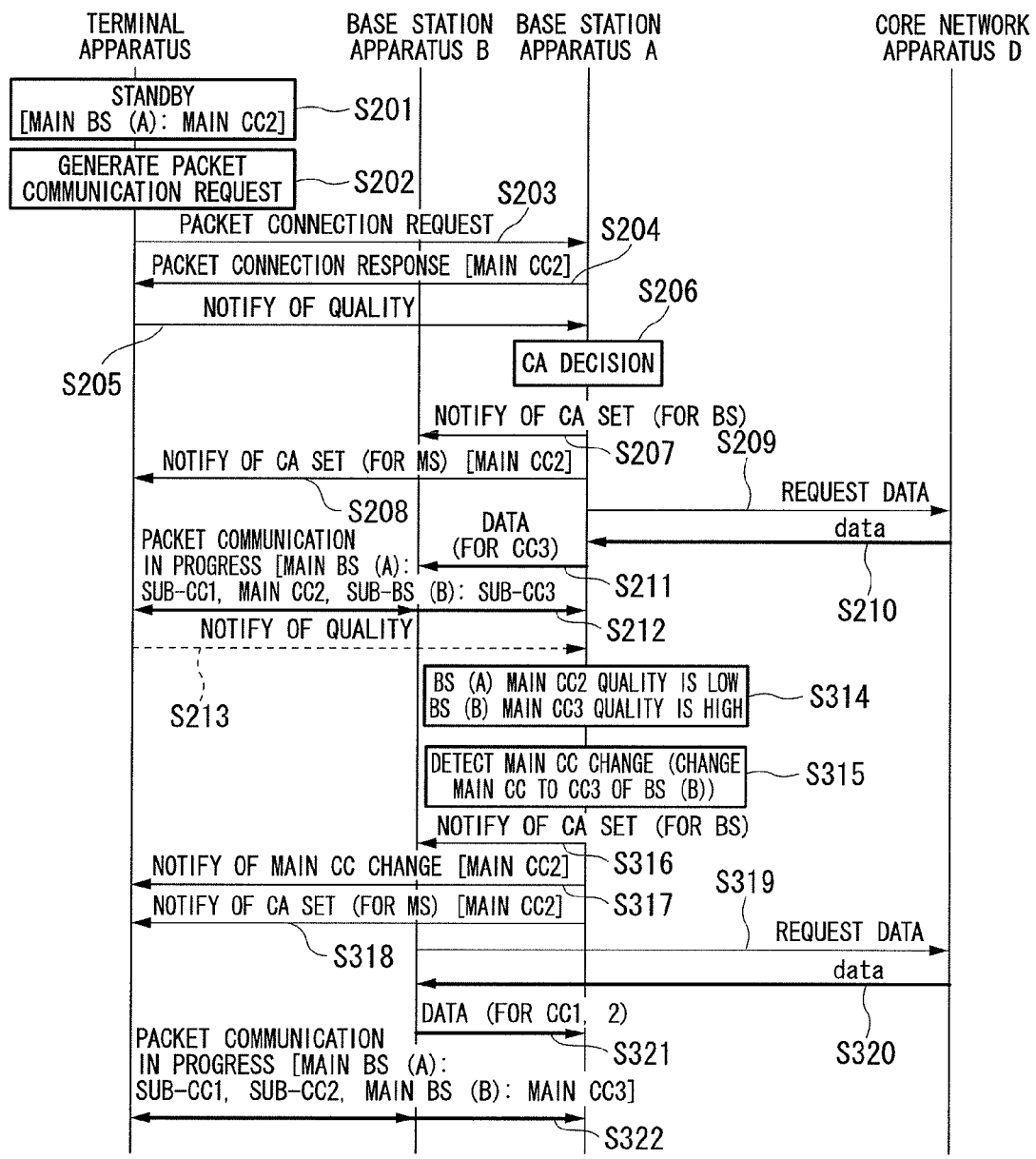
FIG. 16 is a sequence diagram illustrating another example of the operation of a communication system according to the present embodiment.

FIG. 16 is a sequence diagram illustrating another example of the operation of the communication system according to the present embodiment. FIG. 16 illustrates an operation when the terminal apparatus C is connected (including handover) to the base station apparatuses A and B and performs communication. Furthermore, FIG. 16 illustrates the operation when the communication system performs the main CC switching handover process of the main CC in the example of FIG. 15.

When the sequence diagram of FIG. 16 is compared with the sequence diagram of FIG. 14, processes of steps S201 to S213 of FIG. 16 are the same as those of FIG. 14, and thus a description of these processes will be omitted here.

(step S314) As illustrated in FIG. 15, it is assumed that the terminal apparatus C moves from the position of 10a of FIG. 15 to the position of 10 of FIG. 15, so that the propagation quality of communication using CC3 to the terminal apparatus C from the base station apparatus B is higher than the propagation quality of communication using CC2 to the terminal apparatus C from the base station apparatus A. Furthermore, it is assumed that, for the propagation quality of communication using CC2 to the terminal apparatus C from the base station apparatus A, the propagation quality of communication using CC1 is high or a propagation quality next to the propagation quality of communication using CC1 is high. Then, the procedure proceeds to step S315.

(step S315) In the base station apparatus A, the handover detection part 123a of FIG. 3 determines that the terminal apparatus C is to be handed over. That is, the handover detection part 123a detects handover.

Furthermore, the handover execution part 124a performs the CA set selection process, thereby deciding allocation of CCs for downlink communication. The handover execution part 124a generates DLCC allocation information indicating the decided allocation of CCs. The DLCC allocation information indicates that, in the example of 10b of FIG. 15, the base station apparatus A communicates with the terminal apparatus C using CC1 (a sub-CC) and CC2 (a sub-CC), and the base station apparatus B communicates with the terminal apparatus C using and CC3 (a main CC). That is, the handover execution part 124a decides to change a main CC of the base station apparatus A to a sub-CC and to change a sub-CC of the base station apparatus B to a main CC. Then, the procedure proceeds to step S316.

(step S316) The base station apparatus A transmits a CA set notification including the generated DLCC allocation information to the base station apparatus B. In addition, instead of the DLCC allocation information stored in step S206, the DLCC allocation information is stored in the CA storage part 122a of the base station apparatus A and the CA storage part 122b of the base station apparatus B in FIG. 3. Then, the procedure proceeds to step S317.

(step S317) The base station apparatus A transmits a handover notification, which instructs handover to the terminal apparatus C, to the terminal apparatus C. In addition, the packet connection response is transmitted using CC2 which is a main CC. Then, the procedure proceeds to step S318.

(step S318) The base station apparatus A transmits the CA set notification including the generated DLCC allocation information to the terminal apparatus C. In addition, the CA set notification is transmitted using CC2 which is a main CC. Furthermore, instead of the DLCC allocation information stored in step S208, the DLCC allocation information is stored in the CA storage part 121c of the terminal apparatus C in FIG. 3. The terminal apparatus C switches the main CC to a main CC indicated by the DLCC allocation information. Then, the procedure proceeds to step S319.

(step S319) The configurations of the base station apparatuses A and B are changed from the non-hatched configuration of FIG. 3 to the hatched configuration. In this way, the base station apparatus B becomes a main base station apparatus and the base station apparatus A becomes a sub-base station apparatus.

The base station apparatus B transmits a data request for requesting data to the core network apparatus D. Then, the procedure proceeds to step S320.

(step S320) The core network apparatus D transmits the data to the base station apparatus B. Then, the procedure proceeds to step S321.

(step S321) In the base station apparatus B, the payload transmission/reception processing part 132b of FIG. 3 receives the data transmitted in step S320. Furthermore, the data distribution/combination part 132b divides the received data into data of each CC. The data distribution/combination part 132b transmits data, which is to be transmitted on CCs (CC1 and CC2) of the base station apparatus A from the divided data of each CC, to the base station apparatus A. Then, the procedure proceeds to step S322.

(step S322) The base station apparatus B transmits data of CC3 among the data divided in step S321 to the terminal apparatus C using CC3. The base station apparatus A receives the data transmitted from the base station apparatus B in step S321, and transmits data of CC1 and CC2 to the terminal apparatus C using CC1 and CC2.

Hereinafter, the process performed by the terminal control unit 1c will be described.

Figure 17:
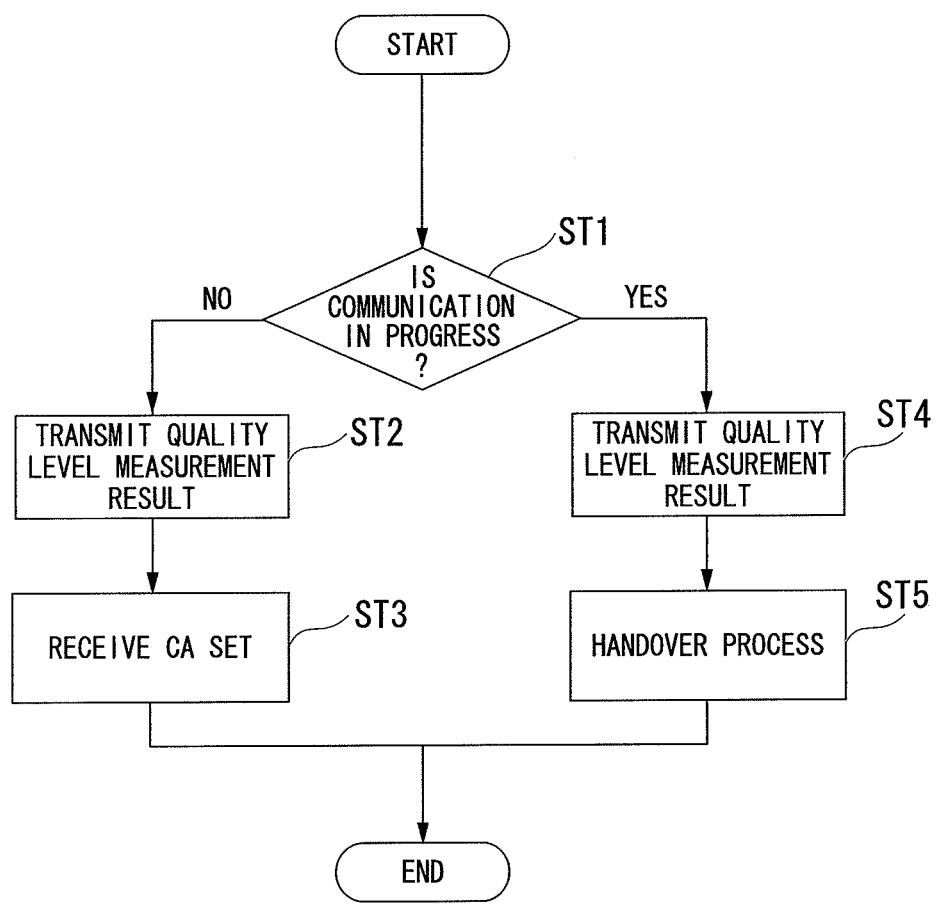
FIG. 17 is a sequence diagram illustrating an example of the operation of a terminal apparatus according to the present embodiment.

FIG. 17 is a sequence diagram illustrating an example of the operation of the terminal control unit 1c according to the present embodiment. FIG. 17 illustrates an example of the operation of the terminal control unit 1c corresponding to the operation of the main base station control unit 1a of FIG. 6. Furthermore, FIG. 17 illustrates a case in which the terminal apparatus C is powered on, is connected to the base station apparatus A, and enters a standby state, or the terminal apparatus C is in communication with the base station apparatus A or B.

(step ST1) The terminal control unit 1c determines whether the terminal apparatus C is in communication with the base station apparatus A or B (whether the terminal apparatus C is not in a standby state). When it is determined that the terminal apparatus C is not in communication with the base station apparatus A or B (no; the terminal apparatus C is in the standby state (is not in communication)), the procedure proceeds to step ST2. Meanwhile, when it is determined that the terminal apparatus C is in communication with the base station apparatus A or B (yes; the terminal apparatus C is in communication (not in the standby state)), the procedure proceeds to step ST4.

(step ST2) The terminal control unit 1c transmits a propagation path quality (a quality level) in downlink communication from each base station apparatus to the terminal apparatus to the base station apparatus A (a main base station apparatus). Then, the procedure proceeds to step ST3.

(step ST3) The terminal control unit 1c receives a CA set notification from the base station apparatus A. Then, the operation is completed.

(step ST4) The terminal control unit 1c transmits the propagation path quality (the quality level) in the downlink communication from each base station apparatus to the terminal apparatus to the base station apparatus A. Then, the procedure proceeds to step ST5.

(step ST5) Then, the terminal control unit 1c receives a handover notification from the base station apparatus A and performs a handover process. Then, the operation is completed.

Figure 18:
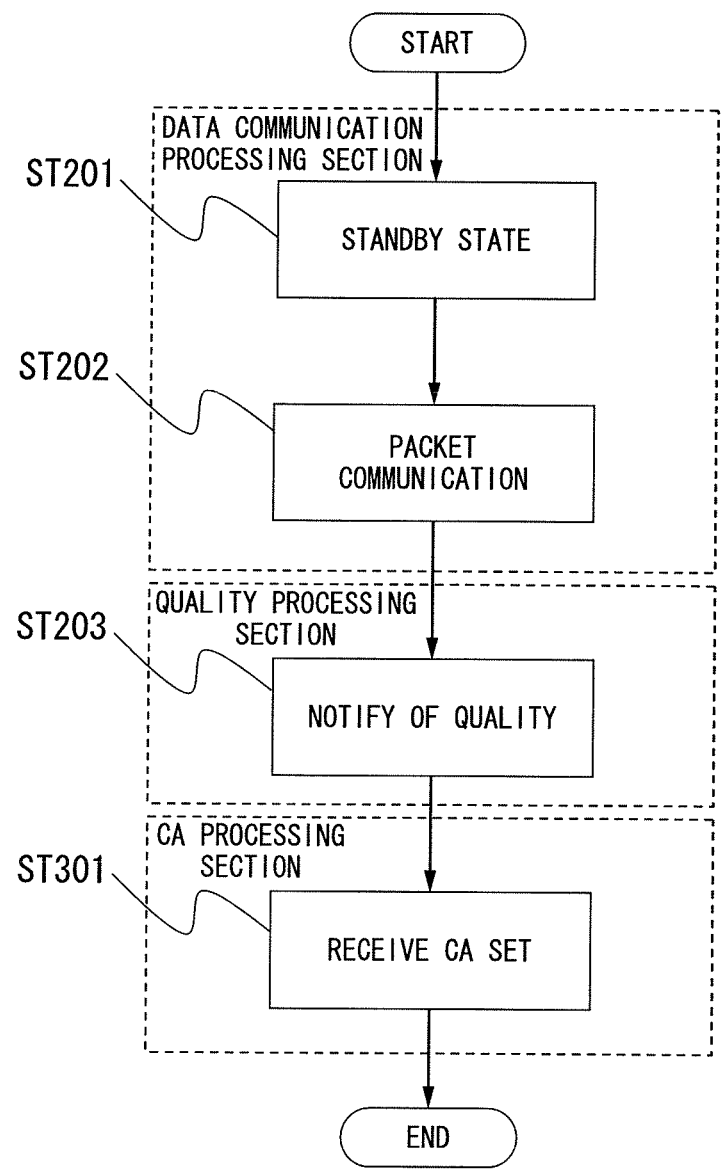
FIG. 18 is a sequence diagram illustrating another example of the operation of a terminal apparatus according to the present embodiment.

FIG. 18 is a sequence diagram illustrating another example of the operation of the terminal control unit 1c according to the present embodiment. FIG. 18 illustrates an example of the operation of the terminal control unit 1c corresponding to the CA decision process of FIG. 7. FIG. 18 illustrates an example of the processes of steps ST2 and ST3 of FIG. 17.

(step ST201) The data communication processing section 131 of the terminal apparatus C enters a communication standby state using a main CC (refer to S101 of FIG. 12 and S201 of FIG. 14). Then, the procedure proceeds to step ST202.

(step ST202) A packet communication request is generated from the standby state, and the data communication processing section 131 transmits or receives the packet communication request (refer to S102 and S103 of FIG. 12 and S202 and S203 of FIG. 14). Then, the procedure proceeds to step ST203.

(step ST203) The quality processing section 11c of the terminal apparatus C notifies the base station apparatus A (a main base station apparatus) of a reception quality using the main CC (refer to S105 of FIG. 12 and S205 of FIG. 14). In addition, an example of a schematic view of DL propagation path quality (reception quality) information is illustrated in FIG. 8. Then, the procedure proceeds to step ST301.

(step ST301) The CA processing section 12c of the terminal apparatus C receives a CA set list notification from the base station apparatus A (refer to S108 of FIG. 12 and S208 of FIG. 14). The CA processing section 12c stores the received CA set list in the CA storage part 121c. The terminal apparatus C (the data communication processing section 13c) performs a reception operation according to the CA set list stored in step ST301, and completes the operation.

Figure 19:
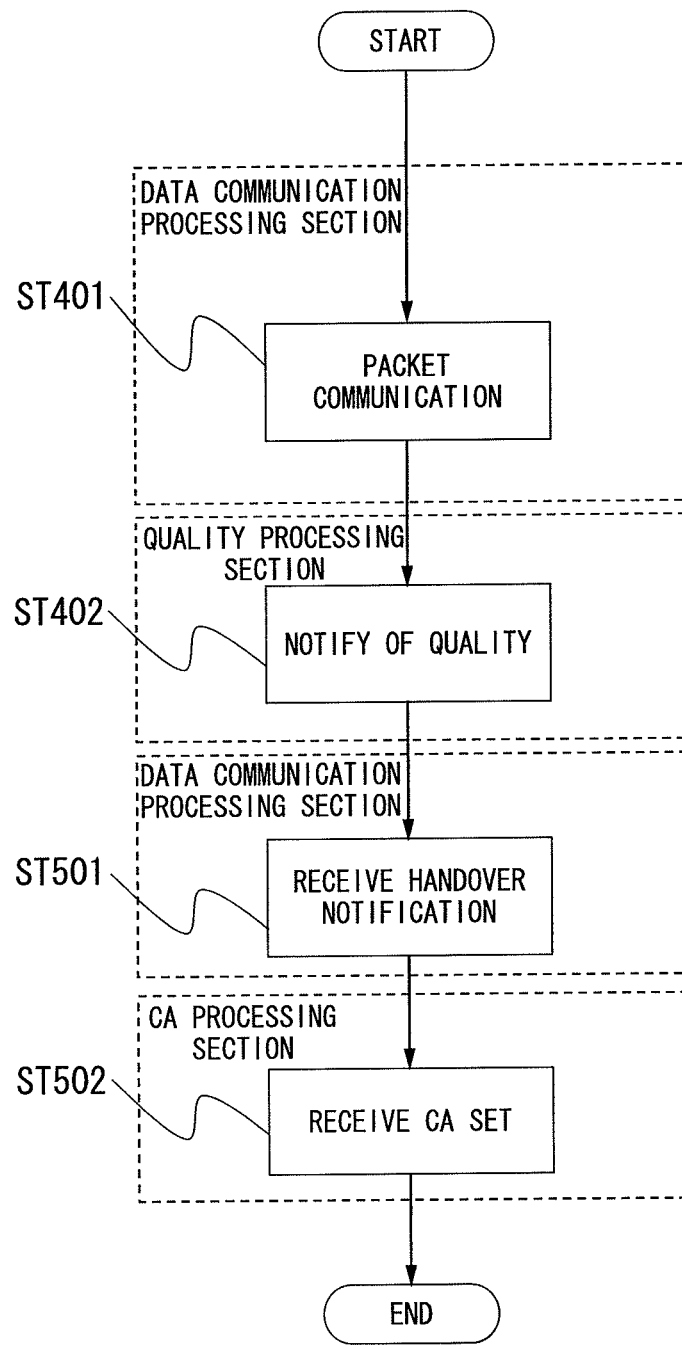
FIG. 19 is a sequence diagram illustrating another example of the operation of a terminal apparatus according to the present embodiment.

FIG. 19 is a sequence diagram illustrating another example of the operation of the terminal control unit 1c according to the present embodiment. FIG. 19 illustrates an example of the operation of the terminal control unit 1c corresponding to the handover process of FIG. 9. FIG. 19 illustrates an example of the processes of steps ST4 and ST5 of FIG. 17.

(step ST401) The data communication processing section 131 of the terminal apparatus C performs packet communication for a base station apparatus after the operation (steps ST2 and ST3 of FIG. 17) of FIG. 18 (refer to S112 of FIG. 12 and S212 of FIG. 13). Then, the procedure proceeds to step ST402.

(step ST402) The quality processing section 11c of the terminal apparatus C notifies the base station apparatus A (a main base station apparatus) of a reception quality using the main CC (refer to S113 of FIG. 12 and S213 of FIG. 14). Then, the procedure proceeds to step ST501.

(step ST501) Here, when it is determined to perform handover, the base station apparatus A transmits a handover notification to the terminal apparatus C using the main CC. The data communication processing section 13c of the terminal apparatus C receives the handover notification (refer to S117 of FIG. 12 and S217 of FIG. 14). Then, the procedure proceeds to step ST502.

(step ST502) Moreover, the base station apparatus A notifies the terminal apparatus C of a CA set list indicating handover combination (a main CC and sub-CCs). The CA processing section 12c of the terminal apparatus C receives the CA set list (refer to S118 of FIG. 12 and S218 of FIG. 14). The CA processing section 12c stores the received CA set list in the CA storage part 121c.

The terminal apparatus C (the data communication processing section 13c) decides the main CC and the sub-CCs according to the combination of CCs of the CA set list stored in step ST502, and performs a reception operation. Then, the operation is completed.

In addition, for handover of the main CC and handover of the sub-CCs in the handover process, since there is no difference in the reception operation of the terminal apparatus C, the terminal apparatus C receives a CA set from a base station apparatus, and performs the CA reception operation according to the combination of the main CC and the sub-CCs.

As described above, according to the present embodiment, the base station apparatus A, for example, allocates a signal, which is obtained by modulating a part of data to be transmitted to the terminal apparatus C, on CC1 and CC2 and transmits the signal, and the base station apparatus B, for example, allocates a signal, which is obtained by modulating a part of data to be transmitted to the terminal apparatus C, on CC3 and transmits the signal. Furthermore, the terminal apparatus C demodulates the signal received from the base station apparatus A using CC1 and CC2 and the signal received from the base station apparatus B using CC3, and integrates the demodulated data.

Consequently, in the present embodiment, it is possible for the wireless communication system to perform communication using CCs of a plurality of base station apparatuses, and to obtain diversity of CCs such as frequency diversity or space diversity. In detail, it is possible for the wireless communication system to select CCs to be used for communication with the terminal apparatus C from the total six CCs (seven CCs when the base station apparatus can use CC4) of CC1 to CC3 used by the base station apparatus A and CC1 to CC3 used by the base station apparatus B. Furthermore, for example, even though CC3 of the base station apparatus A and CC3 of the base station apparatus B are equal to each other, the reception quality of CC2 used by the base station apparatus B may be higher than that of CC3 used by the base station apparatus A (for example, when there is a shielding material on a propagation path to the terminal apparatus C from the base station apparatus A), or the communication traffic may be small. In this case, it is possible for the wireless communication system to select CC2 used by the base station apparatus B even in the case of CC2 of the same frequency band.

Furthermore, according to the present embodiment, in the base station apparatus A serving as a main base station apparatus, the CA decision part 121a selects CCs to be used for communication with the terminal apparatus C from CCs used for communication by a plurality of base station apparatuses, the CA set notification part 125a notifies the base station apparatus B of DLCC allocation information selected by the CA decision part 121a, and the transmission units A2-1 to A2-3 allocate signals, which are obtained by modulating a part of data to be transmitted to the terminal apparatus C, on the CCs selected by the CA decision part 121a, and transmit the signals. Furthermore, in the base station apparatus B serving as a sub-base station apparatus, the transmission units B2-1 to B2-3 allocate signals, which are obtained by modulating a part of data to be transmitted to the terminal apparatus C, on the CCs indicated by the DLCC allocation information notified of by the base station apparatus A, and transmit the signals. Furthermore, in the terminal apparatus C, the reception units C2-1 to C2-3 receive the signals from the base station apparatuses A and B using the CCs, and the wireless processing part 131c integrates the signals received by the reception units C2-1 to C2-3.

Consequently, in the present embodiment, it is possible for the wireless communication system to select CCs to be used for communication with the terminal apparatus C from the CCs used for communication by the plurality of base station apparatuses, and to obtain diversity of CCs such as frequency diversity or space diversity.

Furthermore, according to the present embodiment, the CC used for communication by the base station apparatus A is one main CC selected from the CCs used for communication by the plurality of base station apparatuses. That is, the base station apparatus A is a main base station apparatus, and includes the CA decision part 121a and the CA set notification part 125a. Consequently, in the wireless communication system according to the present embodiment, since the main base station apparatus decides the allocation of CCs and transmits the CCs to the base station apparatus B, it is possible for one base station apparatus to decide the allocation of CCs.

Furthermore, according to the present embodiment, in the base station apparatus A serving as the main base station apparatus, the data distribution/combination part 132a divides data to be transmitted to the terminal apparatus C based on the DLCC allocation information, and transmits the divided data to the base station apparatus B. Consequently, in the wireless communication system according to the present embodiment, since one base station apparatus receives and divides data, it is possible to reduce a processing load of the core network apparatus D as compared with the case in which the core network apparatus D divides data and transmits the divided data to each base station apparatus.

Furthermore, according to the present embodiment, in the terminal apparatus C, the wireless processing part 131c performs communication standby using the main CC and transmits a connection request to the base station apparatus A serving as the main base station apparatus at the time of generation of communication, and the carrier aggregation decision part 121a selects a CC to be used for communication with the terminal apparatus C when the connection request is received from the terminal apparatus C. Consequently, in the wireless communication system according to the present embodiment, it is possible for the terminal apparatus C to perform the communication standby using one CC and to reduce a processing load of the terminal apparatus C as compared with the case of performing communication standby using a plurality of CCs.

Furthermore, according to the present embodiment, the CA decision part 121a and the handover execution part 124a select CCs to be used for communication with the communication apparatus, based on a propagation quality or a communication traffic amount of each CC used for communication by the plurality of base station apparatuses. Consequently, in the present embodiment, the wireless communication system uses a CC with a high propagation quality for communication, thereby preventing the occurrence of a communication error and performing communication with a high quality. Furthermore, in the present embodiment, the wireless communication system uses a CC with a small communication traffic amount for communication, thereby preventing the communication capacity from overflowing.

Furthermore, according to the present embodiment, in the base station apparatus A serving as the main base station apparatus, the handover detection part 123a determines whether to switch CCs to be used for communication with the terminal apparatus C, and the handover execution part 124a selects the CCs to be used for communication with the terminal apparatus C from the CCs used for communication by the plurality of base station apparatuses when the handover detection part 123a has determined to change the CCs. Furthermore, in the base station apparatus A, the CA set notification part 125a notifies the base station apparatus B and the terminal apparatus C of DLCC allocation information indicating the CCs selected by the handover execution part 124a, and the transmission units A2-1 to A2-3 allocate signals, which are obtained by modulating a part of data to be transmitted to the terminal apparatus C, on the CCs selected by the handover execution part 124a, and transmit the signals. In the terminal apparatus C, the reception units C2-1 to C2-3 switch the CCs for receiving the signals to the CCs indicated by the DLCC allocation information notified of by the base station apparatus A. Consequently, in the present embodiment, it is possible for the wireless communication system to change the CCs to be used for communication with the terminal apparatus C between the base station apparatuses.

Furthermore, according to the present embodiment, in the terminal apparatus C, the reception units C2-1 to C2-3 switch only changed component carriers among the CCs indicated by the DLCC allocation information notified of by the base station apparatus A serving as the main base station apparatus. Consequently, in the present embodiment, it is possible for the terminal apparatus C to continue communication with CCs with no change.

So far, in the embodiment, the DLCC allocation information includes an item of a base station type. However, the present invention is not limited thereto. For example, the item of the base station type may be deleted.

FIG. 20 is a schematic view illustrating an example of the DLCC allocation information stored in the base station apparatuses A and B according to a variant of the present embodiment. As illustrated in FIG. 20, the DLCC allocation information has items such as a terminal identification number, a base station identification number, a DL CC identification number, and a CC type. In FIG. 20, an item of a base station type is excluded from the DLCC allocation information of FIG. 4.

FIG. 21 is a schematic view illustrating an example of the DLCC allocation information stored in the terminal apparatus C according to a variant of the present embodiment. As illustrated in FIG. 21, the DLCC allocation information has items such as a base station identification number, a DL CC identification number, and a CC type. In FIG. 21, an item of a base station type is excluded from the DLCC allocation information of FIG. 5.

When the item of the base station type is excluded from the DLCC allocation information, the base station apparatuses A and B and the terminal apparatus C determine a base station apparatus, which has the base station identification number of the DLCC allocation information in which the CC type is "main," as a main base station apparatus.

Furthermore, in the embodiment, the number of terminal apparatuses C may be greater than or equal to 2, or the number of base station apparatuses B may be greater than or equal to 2.

Furthermore, the core network apparatus D may have the functions of the CA decision part 121a and the CA set notification part 125a.

In addition, parts of the base station apparatuses A and B and the terminal apparatus C in the aforementioned embodiment, for example, the quality measurement part 111a, the quality management part 112a, the CA decision part 121a, the CA storage part 122a, the handover detection part 123a, the handover execution part 124a, the CA set notification part 125a, the payload transmission/reception processing part 131a, the data distribution/combination part 132a, the data transmission/reception processing part 133a, the wireless processing part 134a, the quality measurement part 111b, the quality notification part 113b, the CA storage part 122b, the CA set acquisition part 126b, the data transmission/reception processing part 133b, the wireless processing part 134b, the quality measurement part 111c, the quality notification part 112c, the CA storage part 121c, the CA set notification part 122c, and the wireless processing part 131c, may be realized by a computer. In this case, a program for performing the control function may be recorded on a computer-readable recording medium, and a computer system may read and execute the program recorded on the recording medium. In addition, it is assumed that the "computer system" described herein is a computer system embedded in the base station apparatus A, B or the terminal apparatus C, and includes hardware such as a peripheral device or an OS. Furthermore, the "computer-readable recording medium" denotes a portable medium such as a flexible disk, a magneto-optical disc, a ROM, or a CD-ROM, or a storage device such as a hard disk embedded in the computer system. Moreover, the "computer-readable recording medium" may include a medium that dynamically holds a program for a short time, such as a communication line when the program is transmitted through a network such as the Internet or a communication line such as a telephone line, or a medium that holds the program for a constant time such as a volatile memory in a computer system serving as a server or a client in that case. Furthermore, the program may be a program for performing a part of the aforementioned functions, and may further be a program capable of performing the aforementioned functions through a combination with a program already recorded on the computer system.

So far, an embodiment of the present invention has been described in detail with reference to the accompanying drawings. However, detailed configurations are not limited to the aforementioned configurations. For example, various design modifications can be made without departing from the scope of the present invention.

INDUSTRIAL APPLICABILITY

The present invention is applicable to a mobile communication system using a cellular phone as a terminal apparatus.

REFERENCE SYMBOLS

A, B: Base station apparatus
C: Terminal apparatus
D: Core network apparatus
A1, 1a: Main base station control unit
A2-1 to A2-3: transmission unit (first transmission unit)
A3-1 to A3-3: Transmission antenna
A4-1 to A4-3: Reception antenna
A5-1 to A5-3: Reception unit
B1, 1b: Sub-base station control unit
B2-1 to B2-3: Transmission unit
B3-1 to B3-3: Transmission antenna
B4-1 to B4-3: Reception antenna
B5-1 to B5-3: Reception unit
C1-1 to C1-3: Reception antenna
C2-1 to C2-3: Reception unit
C3: Terminal control unit
C4-1 to C4-3: Transmission unit
C5-1 to C5-3: Transmission antenna
11a: Quality processing section
12a: CA processing section
13a: Data communication processing section
111a: Quality measurement part
112a: Quality management part
121a: CA decision part (carrier aggregation decision part)
122a: CA storage part
123a: Handover detection part (switching detection part)
124a: Handover execution part (switching execution part)
125a: CA set notification part (carrier aggregation information notification part)
131a: Payload transmission/reception processing part
132a: Data distribution/combination part (data distribution part)
133a: Data transmission/reception processing part
134a: Wireless processing part
11b: Quality processing section
12b: CA processing section
13b: data communication processing section
111b: Quality measurement part
113b: Quality notification part
122b: CA storage part
126b: CA set acquisition part
133b: Data transmission/reception processing part
134b: Wireless processing part
11c: Quality processing section
12c: CA processing section
13c: Data communication processing section
111c: Quality measurement part
112c: Quality notification part
121c: CA storage part
122c: CA set notification part
131c: Wireless processing part

The invention claimed is:

1. A wireless communication system comprising:
a communication apparatus configured to communication using a plurality of component carriers of a prescribed frequency band; and
a plurality of base station apparatuses,
wherein a first base station apparatus is configured to allocate a signal, which is obtained by modulating a part of data to be transmitted to the communication apparatus, on a first component carrier, and transmit the signal,
a second base station apparatus is configured to allocate a signal, which is obtained by modulating a part of data to be transmitted to the communication apparatus, on a second component carrier, and transmit the signal, and
the communication apparatus is configured to demodulate the signal received from the first base station apparatus using the first component carrier and the signal received from the second base station apparatus using the second component carrier, and integrate the demodulated data,
wherein the first base station apparatus comprises:
a carrier aggregation decision part configured to select component carriers to be used for communication with the communication apparatus from component carriers used for communication by the plurality of base station apparatuses;
a carrier aggregation information notification part configured to notify the second base station apparatus of carrier aggregation information indicating the component carriers selected by the carrier aggregation decision part; and
a first transmission unit configured to allocate the signal, which is obtained by modulating a part of the data to be transmitted to the communication apparatus, on the first component carrier selected by the carrier aggregation decision part, and transmit the signal,
the second base station apparatus comprises:
a second transmission unit configured to allocate the signal, which is obtained by modulating a part of the data to be transmitted to the communication apparatus, on the second component carrier indicated by the carrier aggregation information notified of by the first base station apparatus, and transmit the signal, and
the communication apparatus comprises:
a reception unit configured to receive the signal from the first base station apparatus using the first component carrier and the signal from the second base station apparatus using the second component carrier; and
a wireless processing part configured to integrate the signals received by the reception unit.

2. The wireless communication system according to claim 1, wherein the carrier aggregation information notification part is configured to notify the communication apparatus of the carrier aggregation information, and the reception unit is configured to receive the signals based on the carrier aggregation information of which the first base station apparatus is notified.

3. The wireless communication system according to claim 1, wherein the first component carrier is one main component carrier selected from the component carriers used for communication by the plurality of base station apparatuses.

4. The wireless communication system according to claim 3, wherein the switching execution part or the carrier aggregation decision part is configured to select the main component carrier based on the propagation quality or the communication traffic amount of each component carrier used for communication by the plurality of base station apparatuses.

5. The wireless communication system according to claim 1, wherein the first base station apparatus comprises:
a data distribution part configured to divide the data to be transmitted to the communication apparatus based on the carrier aggregation information, and transmit the divided data to the second base station apparatus,
wherein the first transmission unit is configured to allocate a signal, which is obtained by modulating the data divided by the data distribution part, on the component carrier selected by the carrier aggregation decision part, and transmit the signal,
the second base station apparatus comprises:
a data transmission/reception processing part configured to receive the data received from the first base station apparatus, wherein the second transmission unit is configured to allocate a signal, which is obtained by modulating the data received by the data transmission/reception processing part, on the component carrier indicated by the carrier aggregation information notified of by the first base station apparatus, and transmit the signal.

6. The wireless communication system according to claim 1, wherein the carrier aggregation information includes base station information for identifying the base station apparatuses, component carrier identification information for identifying the component carriers, and component carrier type information indicating whether a component carrier of the component carrier identification information is a main component carrier.

7. The wireless communication system according to claim 6, comprising:
a plurality of communication apparatuses,
wherein each of the first base station apparatus and the second base station apparatus comprises:
a carrier aggregation information storage part configured to store the carrier aggregation information,
wherein the carrier aggregation information stored in the carrier aggregation information storage part includes communication apparatus identification information for identifying the communication apparatuses, the base station information for identifying the base station apparatuses, the component carrier identification information for identifying the component carriers, and the component carrier type information indicating whether the component carrier of the component carrier identification information is a main component carrier.

8. The wireless communication system according to claim 1, wherein the communication apparatus comprises:
a wireless processing part configured to perform communication standby using one component carrier of the first base station apparatus, and transmit a connection request to the first base station apparatus at a time of generation of communication,
wherein the carrier aggregation decision part is configured to select component carriers to be used for communication with the communication apparatus in a case that the connection request is received from the communication apparatus.

9. The wireless communication system according to claim 1, wherein the carrier aggregation decision part is configured to select the component carriers to be used for communication with the communication apparatus based on a propagation quality or a communication traffic amount of each component carrier used for communication by the plurality of base station apparatuses.

10. The wireless communication system according to claim 1, wherein the first base station apparatus comprises:
a switching detection part configured to determine whether to switch the component carriers to be used for communication with the communication apparatus; and
a switching execution part configured to select the component carriers to be used for communication with the communication apparatus from the component carriers used for communication by the plurality of base station apparatuses in a case that a handover detection part has determined to change the component carrier,
wherein the carrier aggregation information notification part is configured to notify the second base station apparatus of carrier aggregation information indicating the component carriers selected by the switching execution part;

the first transmission unit is configured to allocate the signal, which is obtained by modulating a part of the data to be transmitted to the communication apparatus, on the first component carrier selected by the switching execution part, and transmit the signal, and
the reception unit is configured to switch a component carrier for receiving the signal to the component carrier indicated by the carrier aggregation information notified of by the first base station apparatus.

11. The wireless communication system according to claim 10, wherein the switching detection part is configured to determine whether to switch the component carrier based on the propagation quality or the communication traffic amount of each component carrier used for communication by the plurality of base station apparatuses, and
the switching execution part is configured to select the component carriers to be used for communication with the communication apparatus based on the propagation quality or the communication traffic amount of each component carrier used for communication by the plurality of base station apparatuses.

12. The wireless communication system according to claim 10, wherein the switching execution part is configured to select one main component carrier from the selected component carriers, and
a main base station apparatus using the main component carrier, which is selected by the switching execution part, for communication with the communication apparatus comprises:
a switching detection part configured to determine whether to switch the component carriers to be used for communication with the communication apparatus; and
a switching execution part configured to select the component carriers to be used for communication with the communication apparatus from the component carriers used for communication by the plurality of base station apparatuses in a case that a handover detection part has determined to change the component carrier.

13. The wireless communication system according to claim 12, wherein the main base station apparatus comprises:
a data distribution part configured to divide the data to be transmitted to the communication apparatus based on carrier aggregation information indicating the component carriers selected by the switching execution part, and transmit the divided data to the second base station apparatus; and
a transmission unit configured to allocate a signal, which is obtained by modulating the data divided by the data distribution part, on the component carrier selected by the switching execution part, and transmit the signal, and
the second base station apparatus comprises:
a data transmission/reception processing part configured to receive the data received from the main base station apparatus; and
a second transmission unit configured to allocate a signal, which is obtained by modulating the data received by the data transmission/reception processing part, on the component carrier indicated by the carrier aggregation information notified of by the first base station apparatus, and transmit the signal.

14. The wireless communication system according to claim 10, wherein the reception unit is configured to switch only a changed component carrier among the component carriers indicated by the carrier aggregation information notified of by the first base station apparatus.

15. The communication apparatus according to claim 1, the communication apparatus being configured to communicate with the first base station apparatus according to claim 1 and the second base station apparatus according to claim 1.

16. The first base station apparatus according to claim 1, the first base station apparatus being configured to communicate with the communication apparatus according to claim 1 and the second base station apparatus according to claim 1.

* * * * *